US011481388B2

(12) United States Patent
Sianez

(10) Patent No.: US 11,481,388 B2
(45) Date of Patent: Oct. 25, 2022

(54) METHODS AND APPARATUS FOR USING MACHINE LEARNING TO SECURELY AND EFFICIENTLY RETRIEVE AND PRESENT SEARCH RESULTS

(71) Applicant: Roy Fugère Sianez, Bolton, CT (US)

(72) Inventor: Roy Fugère Sianez, Bolton, CT (US)

(\*) Notice: Subject to any disclaimer, the term of this patent is extended or adjusted under 35 U.S.C. 154(b) by 109 days.

(21) Appl. No.: 17/126,264

(22) Filed: Dec. 18, 2020

(65) Prior Publication Data

US 2021/0191925 A1 Jun. 24, 2021

Related U.S. Application Data

(60) Provisional application No. 62/949,683, filed on Dec. 18, 2019.

(51) Int. Cl.
  *G06F 17/00* (2019.01)
  *G06F 7/00* (2006.01)
  *G06F 16/242* (2019.01)
  *G06F 16/248* (2019.01)
  *G06N 5/04* (2006.01)
  *G06N 20/00* (2019.01)

(52) U.S. Cl.
  CPC .......... *G06F 16/243* (2019.01); *G06F 16/248* (2019.01); *G06N 5/04* (2013.01); *G06N 20/00* (2019.01)

(58) Field of Classification Search
  CPC ..... G06F 16/243; G06F 16/248; G06N 20/00; G06N 5/04
  USPC ....................................................... 707/706
  See application file for complete search history.

(56) References Cited

U.S. PATENT DOCUMENTS

| 10,068,016 | B2 | 9/2018 | Wolfram et al. |
| 10,148,777 | B2 | 12/2018 | Arya et al. |
| 10,331,402 | B1 | 6/2019 | Spector et al. |
| 2017/0061021 | A1* | 3/2017 | Royzner ............. G06F 16/9535 |
| 2018/0052824 | A1* | 2/2018 | Ferrydiansyah ....... G06N 20/00 |
| 2019/0163758 | A1* | 5/2019 | Zhivotvorev ..... G06F 16/24578 |
| 2020/0410011 | A1* | 12/2020 | Shi .................... G06F 16/90332 |

OTHER PUBLICATIONS

Lincoln, "Back to Basics: A beginners guide to voice search and digital assistants in 2019," Retrieved from the Internet: URL:https://searchengineland.com/back-to-basics-a-beginners-guide-to-voice-search-and-digital-assistants-in-2019-314010 [retrieved Jan. 4, 2021], dated Mar. 14, 2019, 8 pages.

(Continued)

*Primary Examiner* — Pavan Mamillapalli
(74) *Attorney, Agent, or Firm* — Cooley LLP

(57) ABSTRACT

An apparatus includes a memory, and a processor operatively coupled to the memory. The processor can be configured to provide an indication of a natural language query to a machine learning model such that the machine learning model provides a general term and a specific term based on the natural language query. The processor can also execute at least one predetermined search engine based on the general term to generate a set of search results. The processor can also identify multiple query terms associated with the specific term and based on a word embedding. The processor is further configured to identify relevant parts in each search result from the set of search results based on the multiple query terms.

19 Claims, 7 Drawing Sheets

(56) References Cited

OTHER PUBLICATIONS

Biersdorfer, "Reader Mode in Safari," The New York Times, Retrieved from the Internet: URL: https://www.nytimes.com/2018/07/03/technology/personaltech/safari-reader-mode.html [retrieved Jan. 4, 2021], dated Jul. 3, 2018, 2 pages.

Wallen, "How to add custom search engines in Chrome for more efficient searching," Retrieved from the Internet: URL:https://www.techrepublic.com/article/pro-tip-add-custom-search-engines-in-chrome-for-more-efficient-searching/ [retrieved Jan. 4, 2021],dated Feb. 16, 2016, 7 pages.

* cited by examiner

METHODS AND APPARATUS FOR USING MACHINE LEARNING TO SECURELY AND EFFICIENTLY RETRIEVE AND PRESENT SEARCH RESULTS

CROSS REFERENCE TO RELATED APPLICATIONS

This application claims the benefit of priority under 35 U.S.C. § 119(e) to U.S. Provisional Application Ser. No. 62/949,683 filed Dec. 18, 2019, the disclosure of which is herein incorporated by reference in its entirety.

TECHNICAL FIELD

The present disclosure generally relates to the field of information technology, and in particular to methods and apparatus for using machine learning for information retrieval and content presentation to a user based on a search query.

BACKGROUND

When seeking an answer to a question, users can use a search engine or a suitable information retrieval system to find the answer. Unfortunately, some known search engines present usability issues that can impede a user from finding the answer to their question.

First, some known search engines do not actually provide a direct answer to the user's question. Instead, some known search engines return a list of search results that direct the user to various sources of information, and leave the user to manually investigate the search results to identify the pertinent information that actually contains the answer to their question.

Second, querying a search engine often requires the user to transform their question into a search query designed to interrogate the search engine, which may require the use of special syntax, formatting, or terms.

Third, analyzing the search results of some known search engines can pose a challenge for users with physical, intellectual, visual, or hearing impairments. For example, users with visual impairments may struggle to identify pertinent information because the search results may not include text-to-speech compatible data. Additionally, some sources of information identified by the search engine may not be compatible with assistive technology such as screen readers and magnifiers.

Finally, manually investigating the search results of a search engine can also pose threats to the user's information security and information privacy. For example, the contents of the search results may include targeted advertisements, phishing scams, malware, or other means to collect the user's data.

Thus, a need exists for improved methods and apparatus to securely and efficiently retrieve and present search results that provide an answer to a user's query.

SUMMARY

In some embodiments, an apparatus includes a memory, and a processor operatively coupled to the memory. The processor can be configured to provide an indication of a natural language query to a machine learning model such that the machine learning model provides a general term and a specific term based on the natural language query. The processor can also be configured to execute at least one predetermined search engine based on the general term to generate a set of search results. The processor can also be configured to identify a plurality of query terms associated with the specific term and based on a word embedding. The processor is further configured to identify relevant parts in each search result from the set of search results based on the plurality of query terms. The processor can be configured to assign an indication of likelihood of relevance of each search result from the set of search results to the specific term based on the relevant parts in that search result. The processor can further be configured to select a search result from the set of search results based on the indication of likelihood of relevance of the search result.

DETAILED DESCRIPTION

Figure 1:
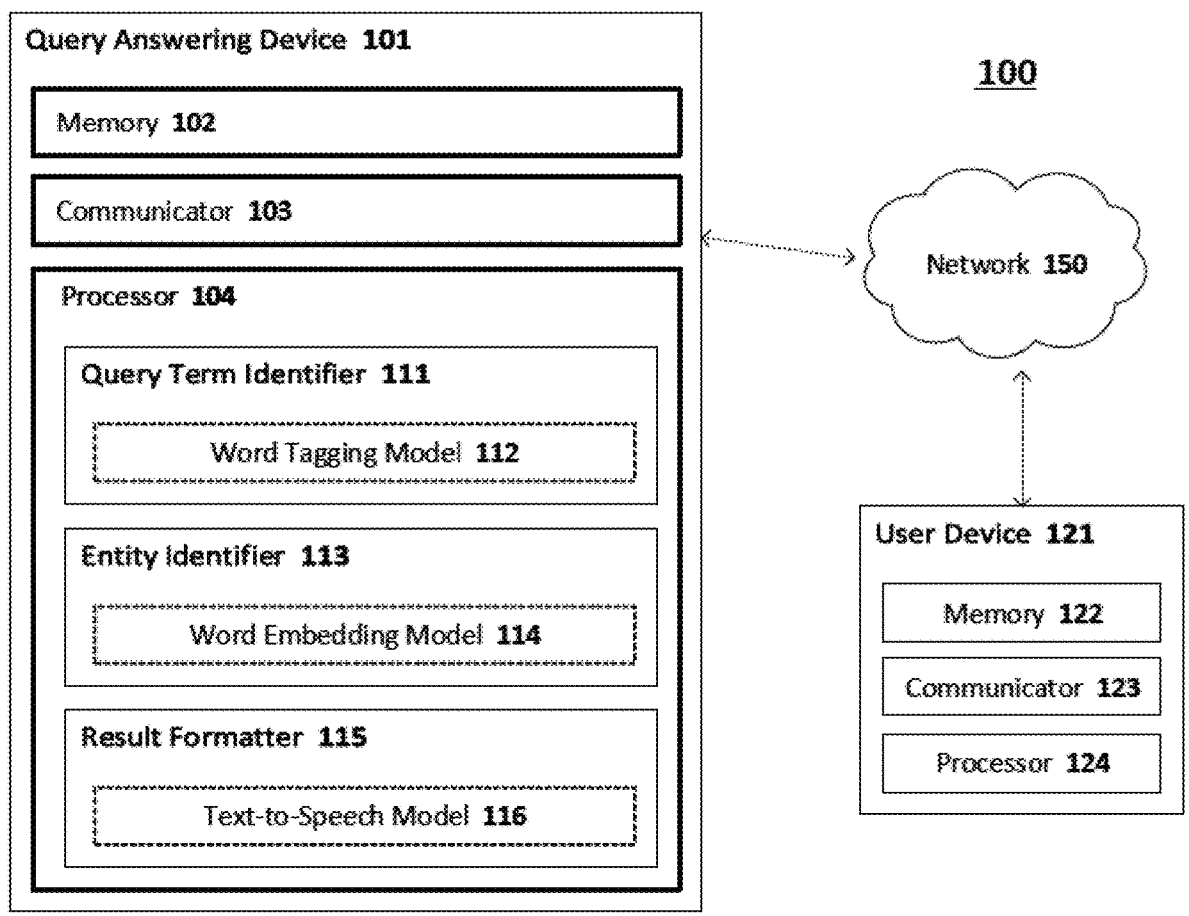
FIG. 1 is a schematic block diagram of a system to provide a formatted search result in response to a search query, according to an embodiment.

Methods and apparatus are disclosed for providing a natural language response to a user's natural language query of a search engine or similar information retrieval system. The methods and apparatus involve using a machine learning model to transform the natural language query to a search query compatible with the search engine, identify pertinent information (also referred to herein as "prominent content") within the search results of the predetermined search engine, and transform a portion of the pertinent information as the natural language response to the natural language query. The methods and apparatus can thus reduce the user's responsibility to manually sort through various search results to identify pertinent information. The use of natural language and the efficient presentation of search results are broadly accessible to a wide range of users, particularly for users with physical, intellectual, visual, or hearing impairments. Further, the method and apparatus can prevent threats to the user's information privacy and information security by preventing the user from accessing websites or programs that may compromise their user data.

In some embodiments, an apparatus includes a memory, and a processor operatively coupled to the memory. The processor can be configured to provide an indication of a natural language query to a machine learning model such that the machine learning model provides and/or identifies a general term and a specific term based on the natural language query. The processor can also be configured to execute at least one predetermined search engine based on the general term to generate a set of search results. The processor can also be configured to identify a set of query terms associated with the specific term and based on a word embedding. The processor is further configured to identify relevant parts in each search result from the set of search results based on the set of query terms. The processor can be configured to assign an indication of likelihood of relevance of each search result from the set of search results to the specific term based on the relevant parts in that search result. The processor can further be configured to select a search result from the set of search results based on the indication of likelihood of relevance of the search result.

In some embodiments, a method includes receiving a set of natural language queries, each natural language query from the set of natural language queries corresponding to at least one query term from a set of query terms. The method further includes defining training data including the set of natural language queries and the set of query terms, and then training a machine learning model based on the training data. The method also includes providing an indication of a natural language query as an input to the machine learning model such that the machine learning model provides an indication of at least one query term. The method further includes executing at least one predetermined search engine to generate at least one search result based on the indication of the at least one query term. The method also includes extracting a relevant part from the at least one search result to generate at least one formatted search result.

In some embodiments, a non-transitory processor-readable medium storing code representing instructions to be executed by a processor includes instructions containing code to cause the processor to receive a natural language query. The instructions for the processor also include classifying the natural language query into a query category from a set of possible query categories. The instructions for the processor further include inputting the natural language query to a machine learning model such that the machine learning model provides a set of query terms based on the natural language query and the query category. The instructions for the processor also include executing a predetermined search engine based on the set of query terms to generate a set of search results, retrieving a set of plain text from the set of search results, identifying a relevant part from the set of plain text based on the set of query terms, and transforming the relevant part as a natural language response to the natural language query.

Disclosed herein are systems and apparatuses for using machine learning to securely and efficiently retrieve and present search results to a user. In some embodiments, an apparatus can receive a query and then generate a response to the query. The query can be expressed in any suitable form. Examples of queries can include, but are not limited to, a question to be answered, or a general topic that the user wants to know more about. In some instances, the query can be expressed as a natural language query, which includes terms in the user's spoken language in a normal manner, without any special syntax, formatting, or terms.

FIG. 1 is a schematic block diagram of a system 100. The system 100 can be the same or similar in structure and/or function to any of the systems described herein. The system 100 includes a query answering device 101 (e.g., an apparatus) connected, via a network 150, to a user device 121. The query answering device 101 includes a memory 102, a communicator 103, and a processor 104. The user device 121 also includes a memory 122, a communicator 123, and a processor 124.

The query answering device 101 can be a hardware-based compute device and/or multimedia device (e.g., a desktop computer, a laptop, a personal computer, a server, a mainframe computer, a smartphone, a tablet, a wearable device, a television, a game console, etc.). In some embodiments, the query answering device 101 can include one or more hardware-based compute devices and/or multimedia devices such that the functionality of the query answering device 101 can be distributed. The query answering device 101 can be configured to receive at least one query, natural language query, and/or at least one indication of a natural language query. The query, natural language query, and/or indication of a natural language query can originate from the memory 102 and/or at least one query source. A query source can be, for example, a file system, an application, a database, a social network, a user device 121, or any other suitable source that can provide a query, natural language query, and/or an indication of a natural language query. While the methods and apparatus are described herein as processing data and/or providing formatted search results from the data, in some instances the query answering device 101 can be used to receive, process and/or generate any collection, batch, or stream of artifacts, events, objects, and/or data. As an example, a query answering device can process and/or generate an artifact such as, for example, any string(s), number(s), images(s), audio(s), video(s), executable file(s), and/or dataset(s). For further examples, an artifact can include a function of software code, a webpage(s), a data file(s), a model file(s), a source file(s), a script(s), a process, a binary executable file(s), a table(s), a database system, a development deliverable(s), an active content(s), a word-processing document(s), an email message(s), a text message(s), and/or the like. As another example, a query answering device can process streams including, for example, a video stream(s), an image stream(s), an audio stream(s), a textual stream(s), and/or the like.

The memory 102 of the query answering device 101 can be, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multi-media card (eMMC), a universal flash storage (UFS) device, or any other suitable memory device that interfaces with a compute device.

The communicator 103 of the query answering device 101 can be operatively coupled to the processor 104, memory 102, and/or the software, processes, and functions stored in the memory 102. In some embodiments, the communicator 103 is a hardware device and/or software (e.g., executed in processor 104 and stored in memory 102). The communicator 103 can be used by the processor 104. The communicator 103 can be, for example, a network interface card (NIC), a Wi-Fi™ module, a Bluetooth® module, an optical communication module, and/or any other suitable wired and/or wireless communication device. Furthermore, the communicator 103 can include a switch, a router, a hub and/or any other network device. The communicator 103 can be configured to connect the query answering device 101 to the network 150. In some instances, the communicator 103 can facilitate receiving and/or transmitting data through the network 150. More specifically, in some implementations the communicator 103 can facilitate receiving and/or transmitting data through the network 150 from and/or to the user device 121, which can be communicatively coupled to the query answering device 101 via the network 150. In some instances, data received by the communicator 103 can be processed by the processor 104 and/or stored in the memory 102, as described in further detail herein.

The processor 104 of the query answering device 101 can be, for example, a hardware based integrated circuit (IC) or any other suitable processing device configured to run and/or execute a set of instructions or code (e.g., stored in memory 102). For example, the processor 104 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor 104 is operatively coupled to the memory 102 through a system bus (for example, address bus, data bus and/or control bus).

The processor 104 can be instructed to perform one or more processes and/or functions. The processor 104 can be configured to include and/or execute a query term identifier 111, an entity identifier 113, and a result formatter 115. The query term identifier 111, entity identifier 113, and/or a result formatter 115 can be software stored in memory 102 and executed by the processor 104. For example, the code to cause the processor 104 to execute the query term identifier 111, the entity identifier 113, and/or the result formatter 115 can be stored in memory 102. The memory 102 can also store a set of files and/or data associated with the query term identifier 111, the entity identifier 113, and/or the result formatter 115. In some implementations, the processor 104 can be a hardware-based device such as, for example, an ASIC, an FPGA, a CPLD, a PLA, a PLC, and/or the like.

The network 150 can be a digital telecommunication network of servers and/or compute devices. The servers and/or computes device on the network can be connected via wired or wireless communication networks to share resources such as, for example, data or computing power. The wired or wireless communication networks between servers and/or compute devices of the network 150 can include one or more communication channels, for example, a radio frequency (RF) communication channel, an extremely low frequency (ELF) communication channel, an ultra-low frequency (ULF) communication channel, a low frequency (LF) communication channel, a medium frequency (MF) communication channel, an ultra-high frequency (UHF) communication channel, an extremely high frequency (EHF) communication channel, a fiber optic commination channel, an electronic communication channel, a satellite communication channel, and/or the like. The network 150 can be, for example, the Internet, an intranet, a local area network (LAN), a wide area network (WAN), a metropolitan area network (MAN), a worldwide interoperability for microwave access network (WiMAX®), a virtual network, any other suitable communication system and/or a combination of such networks.

The user device 121 can be a compute device, such as a personal computer, laptop, smartphone, gaming console, tablet, smart watch, smart television, and/or the like. In some embodiments, the user device 121 can include one or more hardware-based compute devices and/or multimedia devices such that the functionality of the user device 121 is distributed across multiple user devices. Thus, in some embodiments, the user device 121 is a set of user devices where each user device from the set of user devices is operatively and/or communicatively coupled to the query answering device 101 via network 150.

The memory 122 of the user device 121 can be, for example, random access memory (RAM), a memory buffer, a hard drive, a database, erasable programmable read only memory (EPROM), electrically erasable programmable read only memory (EEPROM), read only memory (ROM), flash memory, a hard disk, a floppy disk, cloud storage, and/or so forth.

The communicator 123 of the user device 121 can be, for example, a network interface card (NIC), a Wi-Fi™ module, a Bluetooth® module, an optical communication module, and/or any other suitable wired and/or wireless communication device. The communicator 123 can be configured to connect the user device 121 to the query answering device 101 via the network 150. In some implementations, multiple user devices 121 can be configured to communicate with the query answering device 101 via the network 150. In some instances, the user device 121 can be remotely and operatively coupled with the query answering device 101. Remotely coupling the user device 121 and the query answering device 101 can be achieved by establishing a wired and/or wireless connection (e.g., a Bluetooth connection, a Wi-Fi connection, etc.) between the user device 121 and the query answering device 101. For example, a remote database, memory associated with a social network, a remote compute device, a robot, an Internet of Things (IoT) device, and/or the like, can be remotely and operatively coupled to the query answering device 101 via a network 150.

The processor 124 of the user device 121 can be, for example, a hardware based integrated circuit (IC) or any other suitable processing device configured to run and/or execute a set of instructions or code. For example, the processor 124 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 124 is operatively coupled to the memory 122 of the user device 121 through a system bus (e.g., address bus, data bus and/or control bus).

The processor 104 can optionally include one or more machine learning models, such as a word tagging model 112, a word embedding model 114, and a text-to-speech model 116. For example, the query term identifier 111, entity identifier 113, and/or a result formatter 115 can include one or more machine learning models. The memory 102 can store machine learning model data and a set of files associated with the machine learning model for the one or more machine learning models, such as the word tagging model 112, the word embedding model 113, and/or the text-to-speech model 116. The machine learning model data can include data generated by the one or more machine learning models, such as the word tagging model 112, the word embedding model 113, and/or the text-to-speech model 116, during operation of the query answering device 101. For example, the machine learning model data can include temporary variables, return addresses, variables, metadata, a graph of the machine learning model (e.g., a set of arithmetic operations or a representation of the set of arithmetic operations used by the machine learning model), the graph's metadata, assets (e.g., external files), signatures (e.g., specifying a type of the machine learning model being exported, and the input/output tensors), and/or the like, generated during the operation of the one or more machine learning models of the query answering device 101, such as the word tagging model 112, the word embedding model 113, and/or the text-to-speech model 116. The machine learning model data can also include data used by the one or more machine learning models, such as the word tagging model 112, the word embedding model 113, and/or the text-to-speech model 116, to process and/or analyze data. For example, the machine learning model data can include codes for optimization of and/or improvement of the one or more machine learning models, such as the word tagging model 112, the word embedding model 113, the text-to-speech model 116, interchangeable artificial intelligence (AI) models, and/or the like. As another example, the word embedding model 114 data can include a vector representation library (e.g., fastext, ELMo, Skip-Thoughts, etc.), codes for optimization of the word embedding model 114, and/or the like. In some embodiments, the functionality of the word tagging model 112, the word embedding model 113, and/or the text-to-speech model 116 can be distributed over one or more machine learning models. Similarly, in some embodiments, the functionality of the query term identifier 111, entity identifier 113, and result formatter 115 can be distributed over one or more machine learning models.

The query term identifier 111 can be configured to generate at least one query term based on at least one query (e.g., at least one natural language query, and/or indication of a natural language query). For example, the at least one query term can be the general topic that the user is asking about in the query. The at least one query term can be generated to interface with (e.g., be compatible with) a search engine or set of search engines to generate a set of search results, as further described below.

The query term identifier 111 can include a word tagging model 112. The query term identifier 111 can be configured to train and/or execute the word tagging model 112 to receive a set of queries (e.g., natural language queries, and/or indications of natural language queries), and to return a set of query terms and/or indications of query terms. More specifically, the query term identifier 111 can be configured to receive a batch of data from a query data source. The query data source can be a memory, a web site, a server, a sensor, a device, and/or the like, from which the batch of data is derived and/or in which the batch of data is stored. In some instances, the query data source can include at least one of a database, a file system, an application, a website, and/or the like. The query data source can be the query answering device 101, and/or the user device 121 connected to the query answering device 101 via the network 150. In some implementations, the query data source is the same as the query source. The batch of data from the data source can include a set of queries (e.g., a set of natural language queries, a set of indications of natural language queries), a set of data records associated with the set of queries, a set of query terms, a set of indications of query terms, and/or other training data. The batch of data from the data source can also include a set of sentences, phrases, strings, audio data, video data, and/or the like. The set of data records can include metadata and/or auxiliary information about the set of queries or the set of query terms, for example, number of words, number of characters, date of the query, time of the query, location of the query, language of the query, and/or the like. The batch of data from the query data source can be used to train a machine learning model, for example, the word tagging model 112.

In some implementations, the query term identifier 111 identifies and/or extracts features in the batch of data (for example, strings, numbers, names, dates, times, language, web browser identifiers, operating system identifiers, and/or the like). The query term identifier 111 can be configured to normalize each feature to a common scale. Normalization can also include transforming data into a common format to streamline other processes in the query answering device 101. For example, the set of queries (e.g., natural language queries) can be normalized by converting each letter in the set of queries to a common encoding (e.g., ASCII, UTF8, etc.). The query term identifier 111, using the common format and/or the common scale, can form feature vectors, for example, with predetermined length and/or numerical range. The processor 104 can then be configured to provide the feature vectors and/or the batch of data to train the word tagging model 112.

In some implementations, the query term identifier 111 can be configured to identify and extract features from the batch of data from the query data source. The features can include internal representations of the batch of data, for example, a text stream, a list of query terms, an array of query terms, a tuple of query terms, a dictionary of query terms, numerical data, dates, references, conditional statements, relational statements, metadata, and/or the like. In some implementations, the query term identifier 111 can be configured to remove unessential characters, for example, '<', '>', '#', '{', '}', and/or the like. In some implementations, the query term identifier 111 can be configured to remove unessential words, for example, pronouns, adverbs, and/or the like. The query term identifier 111 can be configured to provide each feature as an input to a hash function to generate a hash value for that feature. The output of the hash function for each feature can be combined with the output of the hash function for the remaining features to define a feature vector. In some implementations, the query term identifier 111 can be configured to represent each letter by a representative decimal, binary, or hexadecimal number.

In some implementations, the query term identifier 111 can be configured to receive a batch of audio signals, and convert the batch of audio signals to the at least one query term. The query term identifier 111 can be configured to perform signal processing techniques (e.g., noise control, audio synthesis, audio effects, frequency conversion, sampling, speech-to-text conversion, etc.) to analyze and/or convert the batch of audio signals to a set of textual features. The query term identifier 111 can be configured further to analyze the set of textual features to generate the at least one query term. For example, the query answering device 101 can be configured to include a microphone (not shown in FIG. 1), or can be configured to be operatively coupled to a microphone. The microphone can be configured to receive a batch of audio signals or receive a stream of audio signals, and transmit the audio signal to the query term identifier 111 to process the set of audio signals to generate the at least one query term.

The word tagging model 112 can be configured and/or trained to analyze and/or accept as input the feature vector(s) to generate an output, including the at least one query term. The processor 104 can be configured to store the at least one query term in the memory 102. The word tagging model 112 includes a set of model parameters including a set of weights, a set of biases, and/or a set of activation functions that, once trained, can be executed to generate the at least one query term from the set of queries. The word tagging model 112 can be selected from among different potential supervised or unsupervised machine learning models and/or algorithms. In some instances, the word tagging model 112 can be, for example, an artificial neural network (ANN), an instance-based learning model, a Bayesian Network, a support vector machine (SVM), a random forest, a linear classifier, a quadratic classifier, a k-nearest neighbor (KNN) model, a decision tree, a hidden Markov model, an expectation-maximization algorithm, a vector quantization model, an information bottleneck method, and/or any suitable machine learning model. The word tagging model 112 can be trained using supervised or unsupervised learning. In an example embodiment, an ANN is used.

In some implementations, the word tagging model 112 can be configured to include a part-of-speech (POS) tagging model. Similar to the word tagging model, the POS tagging model can be selected from among different potential supervised or unsupervised machine learning algorithms, as described above. In some embodiments, POS tagging model can include at least one of a lexical based model (e.g., most frequently occurring word), a rule based model (e.g., words ending with 'ed' or 'ing' are verbs), a probabilistic model (e.g., a Hidden Markov Model), or a deep learning model (e.g., a Long Short Term Memory).

In some implementations, the word tagging model 112 can be an ANN model configured to have an input layer, an output layer, and one or more hidden layers including a normalization layer, a hidden layer, a dropout layer, and/or an activation layer, as described in further detail herein. The ANN model can be configured to receive at least one of the set of queries or the set of data records in the form of the batch of data, as an input vector at the input layer. The ANN model can be iteratively trained based on at least one of the set of queries or the set of data records (as described above) to generate a trained ANN model. The trained ANN model can then be executed to generate an output, via the output layer, including the set of query terms. For example, the ANN model 106 of the query term identifier 111 can receive a natural language query of "find a local restaurant for dinner" with a data record of "query location: London" and "query language: English", and generate query terms of "restaurant" and "London" as output to the query term identifier 111.

In use, the trained word tagging model 112 of the query term identifier 111 can be configured to generate a first term (also referred to herein as the 'general term') and a second term (also referred to herein as the 'specific term') for a query (e.g., a natural language query from a user device). The first term can include multiple words to define the first term. The second term can also include multiple words to define the second term. The first term is used to generate a set of search results while the second term is used to search the set of search results to identify prominent parts, texts, images, media files, and/or the like of the set of search results. More specifically, in some implementations, the trained word tagging model 112 can be configured to identify and/or extract features (e.g., strings, numbers, names, dates, times, languages, web browser identifiers, operating system identifiers, and/or the like) for the query. The word tagging model 112 can be configured to normalize the features to a common scale. Normalization can also include transforming data into a common format. For example, the query, the first term, and/or the second term can be normalized by converting each letter in the query, the first term, and/or the second term to a common encoding (e.g., ASCII, UTF8, etc.). The trained word tagging model 112, using the common format and/or the common scale, can form feature vectors, for example, feature vectors with predetermined length and/or numerical range. In some implementations, the trained word tagging model 112 can be configured to remove unessential characters, for example, '<', '>', '#', I', and/or the like. In some implementations, the trained word tagging model 112 can be configured to remove unessential words, for example, pronouns, adverbs, and/or the like. In general, the trained word tagging model 112 can be configured to process the query, the first term, and or the second term using methods and techniques described above in accordance with query term identifier 111 and/or in the process of training the word tagging model 112. While shown and described herein as generating and/or identifying a first term and a second term, in other implementations, any number of terms can be generated and/or identified by a query (e.g., a single term, three terms, four terms, etc.).

In some implementations, the trained word tagging model 112 can be configured to generate a general term from a query that asks for general information about a topic. The general term can be an umbrella term to cover a broad categorical concept of the query. In one example, the trained word tagging model 112 can be configured to receive the query of "What is Connecticut?", and generate the general term "Connecticut". In another example, the trained word tagging model 112 can be configured to receive the query of "What is a hamburger?", and generate the general term "hamburger". In another example, the trained word tagging model 112 can be configured to receive the query of "Who is George Washington?", and generate the general term "George Washington".

In some implementations, the word tagging model 112 can be configured to generate the general term and a specific term from a query that asks for a specific piece of information about a general topic. The specific term can refer to an attribute of the general term. In one example, the word tagging model 112 can be configured to receive the query of "What is the capital of Connecticut?", and generate the general term "Connecticut" and the specific term "capital". In another example, the word tagging model 112 can be configured to receive the query of "How many calories are in a hamburger?", and generate the general term "hamburger" and the specific term "calories". In another example, the word tagging model 112 can be configured to receive the query of "Who was George Washington's vice president?" to generate the general term "George Washington" and the specific term "vice president".

In some implementations, the trained word tagging model 112 can be configured to generate the general term, the specific term, and a third term. The general term can be the general subject of the query, and the specific term and the third term can be attributed to the general term to provide a specific description of the general term. In one example, the word tagging model 112 can be configured to receive the query of "what's the population of the capital of Connecticut?", and generate the general term of "Connecticut", the specific term of "capital", and the third term of "population". Similarly, the trained word tagging model 112 can be configured to process more complex queries with the general term, the specific term, the third term, and terms with additional and/or higher hierarchies. In one example, the third term can be used by the entity identifier 113 to generate and/or identify the set of relevant parts of the set of search results. The entity identifier 113 can be configured to search within the contents of the set of search results using the specific term and the third term to identify relevant parts (e.g., phrases, sentences, figures, drawing, or paragraphs) that include at least one of the specific term or the third term.

The query terms (i.e., the set of query terms) can be used to generate a set of search results from a search engine or set of search engines. In some embodiments, the processor 104 can be configured to generate the set of search results using a set of search engines. The set of search engines can be predetermined or can be determined for the query, based on at least one of the query or a metadata associated with the query. In some implementations, the search engine is a predetermined search engine, as specified by the user, the processor 104, network 150, and/or user device 121. In some implementations, the set of search engines is a local search engine within the user device 121 (e.g., searching through data and files stored on the user's device) and executed via the processor 104 and memory 102. In some implementations, the search engine interrogates a curated knowledge base that is stored in the memory 102 and/or on a separate compute device and accessed via the network 150. In some implementations, the set of search engines can be accessed via a predetermined set of websites. The processor 104 can be configured to transmit at least a portion of the set of query terms, using the communicator 103, and via the network 150, to the set of search engines to generate the set of search results based on the portion of the set of query terms. The processor 104 can be configured further to receive the set of search results from the set of search engines. The processor 104 can be configured further to use the word embedding model 114 (described in further detail herein) to identify a set of words similar to or associated with the second term. In some implementations, the processor 104 can receive a set of search results based on the general term (e.g., the first term) of the query terms, and then use the word embedding model 114 to locate and/or identify prominent portions of the set of search results relevant to the specific term (e.g., the second term) and/or other query terms. The prominent portions of the set of search results can be, for example, definition text, description text, statistical statements, figures, media files, and/or the like.

For example, the query term identifier 111 can be configured to generate the first term, and the processor 104 can be configured to append the first term to a predetermined (e.g., pre-identified) search engine accessed by using a uniform resource locator (URL), e.g., "https://en.wikipedia.org/wiki/" or "http://en.oxforddictionaries.com/definition/", etc., to generate an updated search engine URL. The updated search engine URL can produce and/or link to a webpage and/or other resources that the query answering device 101 can download using the communicator 103 and via the network 150. In one example, the updated search engine URL links to a Hypertext Markup Language (HTML) file, and the processor 104 can be configured to download the HTML file to the memory 102. In some implementations, the processor 104 can be configured to present the first term to an application programming interface (API) of a search engine. The API can in return present the first term to execute the search engine to produce links to a webpage and/or other resources that the query answering device 101 can access and/or download.

In circumstances that no resources are located at the updated search engine URL (e.g., an attempt to access the updated search engine URL produces an error), the processor can generate a word stem of the first term, and append the word stem to the predetermined search engine URL to generate a revised search engine URL. The processor 104 can be configured to access and/or download a resource or an HTML file to which the revised search engine URL links. The word stem can be generated by using, for example, a word stem generator procedural program, a lemma tagger, a natural language processing framework, and/or the like. In some implementations, the word stem is generated using a machine learning model. In one example, the word stem generator can generate a word stem (e.g., read, bear, skill, etc.) from a word (e.g., readable, unbearable, skilled, etc.) by removing prefixes (e.g., 'un-', 'anti-', etc.) of the word and/or suffixes of the word (e.g., '-ed', '-able', etc.).

When a resource or an HTML file is found at the updated search engine URL or the revised search engine URL, the processor 104 can be configured to locate and/or identify pertinent information. Pertinent information can be located and/or identified as at least one prominent part of the resource or the HTML file to be presented as part of the set of search results. The prominent part of the resource or the HTML file can be, for example, a definition text, a description text, a statistical statement, a figure, a media file, and/or the like. In an example, the processor 104 can be configured to locate and/or identify the first definition included in an HTML file from an online dictionary or encyclopedia, parse the HTML file to remove the HTML scripts to generate the text of the first definition, and present the text of the first definition to a user. In another example, the processor 104 can be configured to locate and/or identify a figure, in a document file that is hyperlinked in an HTML file, to be presented as part of the set of search results, remove the HTML scripts to generate an image of the figure and/or a caption of the figure, and present the image and/or the caption to the user.

The entity identifier 113 can be configured to identify pertinent information within the search results. The entity identifier 113 can be configured to receive the query and/or the query terms, including the first term and/or the second term if applicable. The entity identifier 113 can be configured to identify a set of words associated with and/or similar to the query, the query terms, the first term, and/or the second term, based on a word embedding model 114 (also referred to herein as the "word embedding").

In some implementations, the query answering device 101 can be configured to generate the word embedding model 114. In some implementations, the word embedding model 114 can be generated based on a language-specific corpus, for example, a corpus from an English news website, a corpus from a German dissertation, a corpus from a Japanese user manual, a corpus from a Russian novel, a corpus from Wikipedia, a corpus from a dictionary, and/or the like. In some implementations, the word embedding model 114 can be generated based on a domain-specific corpus, for example, a corpus from journal papers about quantum physics, a corpus from United States patents, a corpus from books about Greek mythology, and/or the like. In some implementations, the query answering device 101 can receive the word embedding model 114 (e.g., from a device via the network 150) by a compute device different from the processor 104 and can store the word embedding model 114 in the memory 102.

The word embedding model 114 can be stored in a memory 102 of the query answering device 101. The entity identifier 113 can be configured to find a position, for example, for a query term, in the word embedding model 114. The entity identifier 113 can be configured to generate and/or identify a set of words similar to and/or associated with the query term based on a position of the set of words in the word embedding model 114 relative to the position of the query term. For example, the entity identifier 113 can be configured to find a position for the query term 'sushi' in the word embedding model 114. The entity identifier 113 can be configured to receive the query term 'sushi', and then identify a set of words such as, for example, 'rice', 'tuna', 'salmon', and 'wasabi' associated with the query term in the word embedding model 114.

The entity identifier 113 can be configured to generate and/or identify a set of relevant parts of the set of search results based on at least one of the specific term or the set of words. The entity identifier 113 can be configured to search within the contents of the set of search results to identify relevant parts (e.g., phrases, sentences, figures, drawing, or paragraphs) that include at least one of the specific term or at least one word from the set of words. The entity identifier 113 can then include a word tagger to identify a set of entities (e.g., cities, dates, names, etc.) in the set of relevant parts. The entity identifier 113 can then assign a score (also referred to herein as a 'likelihood of relevance') to each relevant part from the set of relevant parts by identifying the set of entities in the relevant part. In some embodiments, the entity identifier 113 can assign an indication of likelihood of relevance to each relevant part from the set of relevant parts by identifying the set of entities in the relevant part. The entity identifier 113 can present a subset of the most relevant parts to a user. The subset of the most relevant parts can have a score higher than a predetermined score and/or threshold, or have a higher position among the set of relevant parts than a predetermined position.

In some implementations, the entity identifier 113 can be configured to receive the specific term from the query term identifier 111. The entity identifier 113 can be configured to identify a set of words associated with the specific term based on the word embedding model 114. Specifically, the entity identifier 113 can be configured to find a position for the specific term in the word embedding model 114. The entity identifier 113 can then generate the set of words based on the position of the words in the word embedding model 114 relative to the position of the specific term. For example, the set of words can be chosen by finding terms in the word embedding model 114 with a position within a certain distance from the position of the specific term.

The result formatter 115 can be configured to receive the subset of the most relevant parts to generate at least one response to the query, which can be expressed as a natural language response, an indication of a natural language response, and/or as a formatted search result. In some instances, the formatted search result can include a search result displaying a paragraph and a figure, a search result with portions converted to an audio message, and/or a search result with text formatted to the size, font, shape, contrast, color, etc. that suits the user. In some instances, the response to the query can presented to a user or a user device from the set of user devices 121. Optionally, the result formatter 115 can include a text-to-speech model 116 to present the subset of the most relevant parts to the user or a user device from the set of user devices 121. The result formatter 115 can be configured to remove specific types of content of the at least one formatted result. The specific types of content can include HTML scripts of the at least one formatted result, Javascript script of the at least one formatted result, textual content in brackets in the at least one formatted result, textual content in parentheses in the at least one formatted result, and/or the like.

The result formatter 115 can be configured further to provide a media item or an indication of the media item to a user (e.g., via a user device from the set of user devices 121). The media item can include an image, a table, a video, a drawing, an animated drawing, an audio file, and/or the like. The indication of the media item can include a link to a video, a link to an image, a link to a table, a link to a webpage, a link to an audio file, and/or the like. The result formatter 115 can be configured to format an appearance of the media item or the indication of the media item. For example, the result formatter 115 can be configured to crop, resize, and/or process an image before presenting the image to the user (e.g., via a user device from the set of user devices 121).

The text-to-speech model 116 can include a machine learning model on the query answering device 101, a text-to-speech application programming interface (API) provided over the network 150 (also referred to herein as the 'cloud'), and/or any other suitable text-to-speech device or program. The text-to-speech model 116 can receive the subset of most relevant parts in a text format, and then present the subset to the user. In some implementations, the subset is presented as a natural language response to the user's query, and may be expressed visually (e.g., on a screen of the user device 121), audibly (e.g., as an audio signal), or as any other suitable medium of communication to the user.

In some embodiments, the subset is presented as an audio signal (also referred to herein as 'audio message') to the user describing the subset of most relevant parts in a spoken language such as, for example, 'Chinese', 'French', 'English', 'German', and/or any other suitable spoken language. The text-to-speech model 116 can be, for example, a procedural program connecting each word in the subset of most relevant parts to the audio signal, a text-to-speech API on a cloud service receiving the subset of most relevant parts from the query answering device 101 via the network 150 and sending the audio signal back to the query answering device 101 via the network 150 to be presented to the user. While shown in FIG. 1 as being on the query answering device 101, in some embodiments, the text-to-speech model can be, for example, locally stored and/or executed in the user device 121. By removing specific content (e.g., in brackets and in parentheses) using the result formatter 115, the audio signal can exclude non-prominent content and/or content resulting in disruptive audio from the audio signal such as, for example, open parenthesis, close parenthesis, open bracket, close bracket, content that includes parenthetical remarks, content that includes supplementary remarks, and/or the like. In an example, an original text of "two light beams (composed of more than one monochromatic light) could look alike but be physically different", the parenthesis characters of '(' and ')', and the parenthetical content of 'composed of more than one monochromatic light' can be removed to generate an edited text of "two light beams could look alike but be physically different". The text-to-speech model 116 can receive the edited text and present the edited text as an audio signal to the user (i.e., send the audio signal to the user device 121). The audio signal excludes an audio signal representing the parenthesis characters of ('and ')', and the parenthetical content of 'composed of more than one monochromatic light'.

In use, the query answering device 101 can prevent potential malicious scripts and/or unintended content, linked to or inserted in an HTML file, to be presented to the user and/or executed by the set of user devices 121. By removing the HTML scripts from the set of search results using the query answering device 101, the set of search results can exclude unintended content and/or information security threats such as, for example, phishing scams, advertisements, malware, and/or other software and programs that can compromise the user's data. In some instances, the processor 104 can be configured further to remove content in brackets, parentheses, and/or the like. In an example, a malicious Javascript script can be linked to or injected into an HTML file that is returned as a search result in response to a query from the set of user devices 121. The HTML file can include HTML scripts, prominent content, a malicious Javascript script enclosed in a '<script> HTML tag' of the HTML scripts, and/or other content. The query answering device 101 is configured to remove the HTML scripts and scripts enclosed by the '<script> HTML tag', and identify prominent content of the HTML file. By removing the HTML scripts and scripts enclosed by the '<script> HTML tag', from the HTML file, the malicious Javascript script can also be removed from the HTML file. In another example, a cookie can be natively written to, linked to, or injected in an HTML file returned as a search result, to monitor the user (e.g., via the set of user devices 121) and/or the user's behavior. The cookie can be, for example, an HTML script, a tracking cookie that contains one or more unique identifiers in form of a plain text data for advertisement targeting, a PHP: Hypertext Preprocessor (PHP) script, a Node.JS script, a Ruby script, and/or the like. The query answering device 101 is configured to remove and/or disable the cookie(s) and provide the prominent content of the HTML file to the user.

Figure 2:
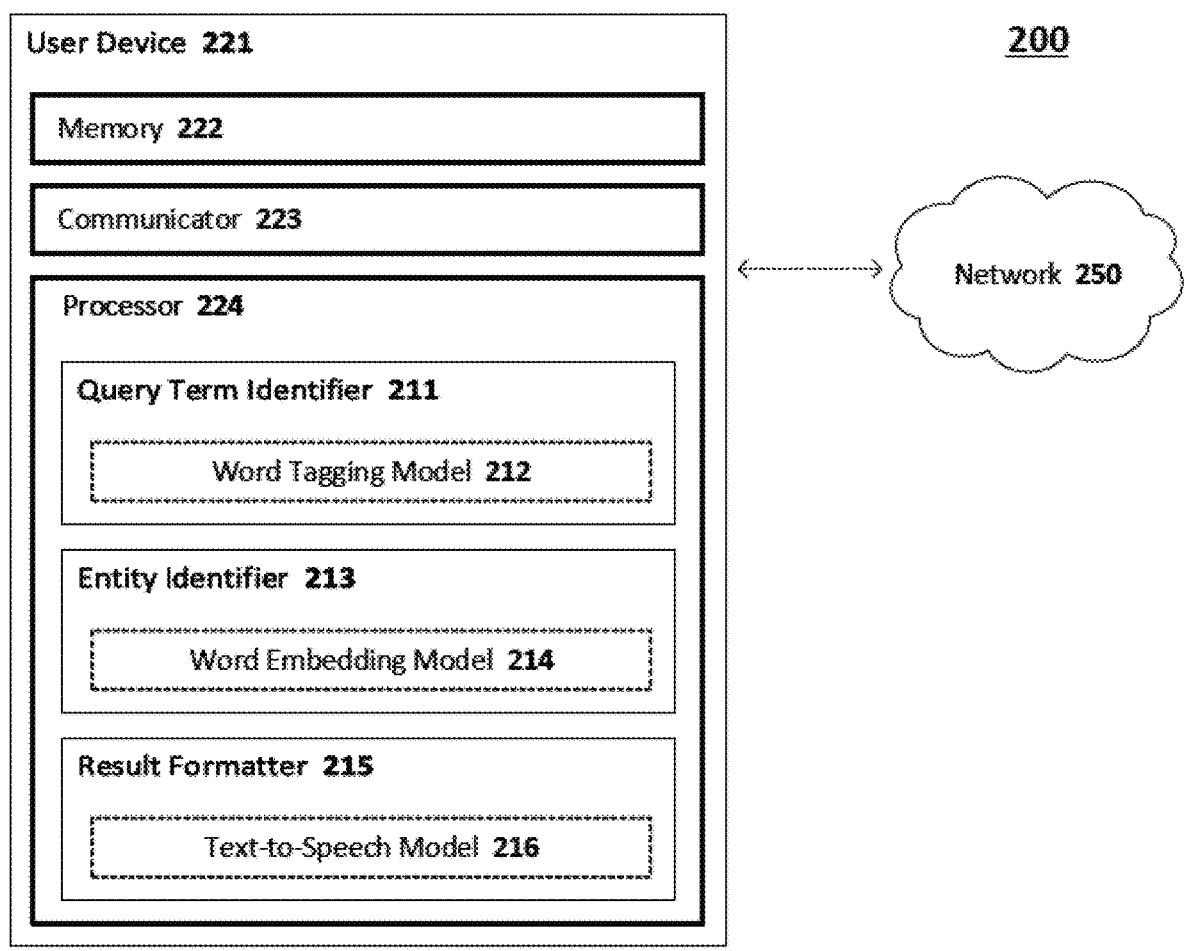
FIG. 2 is a schematic block diagram of a system to provide a formatted search result in response to a search query, according to an embodiment.

FIG. 2 is a schematic block diagram of a system 200. The system 200 can be the same or similar in structure and/or function to any of the systems described herein, such as the system 100. For example, the system 200 includes a user device 221 (e.g., an apparatus) having a memory 222, a communicator 223 and a processor 224, and connected to a network 250. The memory 222, the communicator 223 and the processor 224 can be functionally and/or structurally similar to the memory 122, the communicator 123 and the processor 124, respectively, shown and described with respect to FIG. 1. Moreover, the network 250 can be functionally and/or structurally similar to the network 150, shown and described with respect to FIG. 1.

The user device 221 includes a processor 224 that can be instructed to perform one or more processes and/or functions. For example, the processor 224 of the user device 221 can be configured to include and/or execute a query term identifier 211, a word tagging model 212, an entity identifier 213, a word embedding model 214, a result formatter 215, and a text-to-speech model 216 that can be functionally and/or structurally similar to the query term identifier 111, the word tagging model 112, the entity identifier 113, the word embedding model 114, the result formatter 115, and the text-to-speech model 116, respectively. The query term identifier 211, word tagging model 212, entity identifier 213, word embedding model 214, result formatter 215, and text-to-speech model 216 can be software stored in memory 222 and executed by the processor 224. For example, the code to cause the processor 224 to execute the query term identifier 211, word tagging model 212, entity identifier 213, word embedding model 214, result formatter 215, and text-to-speech model 216 can be stored in memory 222. The memory 222 can also store a set of files and/or data associated with the query term identifier 211, word tagging model 212, entity identifier 213, word embedding model 214, result formatter 215, and text-to-speech model 216. For example, the query term identifier 211, the entity identifier 213 and the result formatter 215 can be included in a native application executed at the user device 211 (e.g., a mobile device).

The user device 221 contains similar functionality as the query answering device 101. For example, the processor 224 included in the user device 221 can be configured to use the communicator 223 to receive data from a data source (e.g., the memory 222, network 250, or any other suitable source of data). Further, the processor 224 can receive data from an input device of the user device 221 (e.g., a keyboard, microphone, keypad on a touch screen, etc.). The user device 221 can use the communicator 223 to receive a query, such as a natural language query. For example, the user device 221 can receive a query in the form of a sentence input by the user via a digital keyboard of a smartphone. The user device 221 can be configured to analyze the query (e.g., a natural language query) using the query term identifier 211, included in and/or executed by the processor 224. The query term identifier 211 can be configured to identify and extract features from the query, and normalize the query and the features to a common scale and/or a common encoding. The query term identifier 175 can be configured further to execute a word tagging model 212 each time the user device receives a query to generate a set of query terms. The set of query terms can be configured to be input into a set of search engines to generate a set of search results (e.g., the query terms can interrogate the search engine to produce search results). In some implementations, the set of search engines can be accessed via the network 250, or a local search engine within the user device 221 and executed via the processor 224 and memory 222. In some implementations, the set of query terms includes a first term and a second term. The first term can include multiple words to define the first term. The second term can also include multiple words to define the second term. The first term can be used to generate a set of search results using a set of search engines (e.g., accessed via network 250) while the second term can be used to search the set of search results to identify pertinent information (e.g., prominent parts, texts, images, or media files) within the set of search results.

The entity identifier 213 can be configured to identify pertinent information within the set of search results. The entity identifier 213 can be configured to receive the query (e.g., the natural language query), and/or the query terms, including the first term and/or second term if applicable. The entity identifier can be configured to identify a set of words associated with and/or similar to the query, the query terms, the first term, and/or the second term, based on the word embedding model 214. The entity identifier 213 can be configured further to generate a set of relevant parts of the set of search results based on the set of words. For example, the entity identifier 213 can use a word tagger to identify a set of entities and assign a likelihood score to each relevant part from the set of relevant parts. The entity identifier 213 can present the subset of most relevant parts (e.g., a part with a score higher than a predetermined threshold) to the result formatter 215.

The result formatter 215 can be configured to modify the representation of the subset of most relevant parts to generate at least one response to the query, which can be expressed as a natural language response, and indication of a natural language response, and/or a formatted search result, similar to the result formatter 115. In some embodiments, the formatted search result can include a search result displaying a paragraph and a figure, a search result with portions converted to an audio message, or a search result with text formatted to the size, font, shape, contrast, color, etc. that suits the user. For example, the result formatter 215 can use the text-to-speech model 216 to present the most relevant parts as a natural language response to the user's query, and may be expressed visually (e.g., on a screen of the user device 221), audibly (e.g., as an audio signal), or as any other suitable medium of communication to the user. In some embodiments, the formatted search result includes a modified appearance of a search result (e.g., a media item), and/or converting textual content of the most relevant parts to an audio message based on a text-to-speech model 180. The text-to-speech model 216 can be stored locally to convert the textual content to the audio message on the user device 2211. The result formatter 215 can be configured further to communicate the subset of most relevant parts, the audio message, and/or the media item to the user via the user device 221.

Disclosed herein are methods for using machine learning to securely and efficiently retrieve and present search results to a user. In some embodiments, a method includes providing an indication of a natural language query to a machine learning model such that the machine learning model provides a general term and a specific term associated with the natural language query. The method further includes executing at least one predetermined search engine based on the general term to generate at least one search result. The method further includes identifying multiple terms associated with the specific term based on a word embedding model. The method further includes identifying content in the at least one search result based on the multiple terms associated with the specific term. The method further includes parsing data from the content to generate at least one formatted search result.

Figure 3:
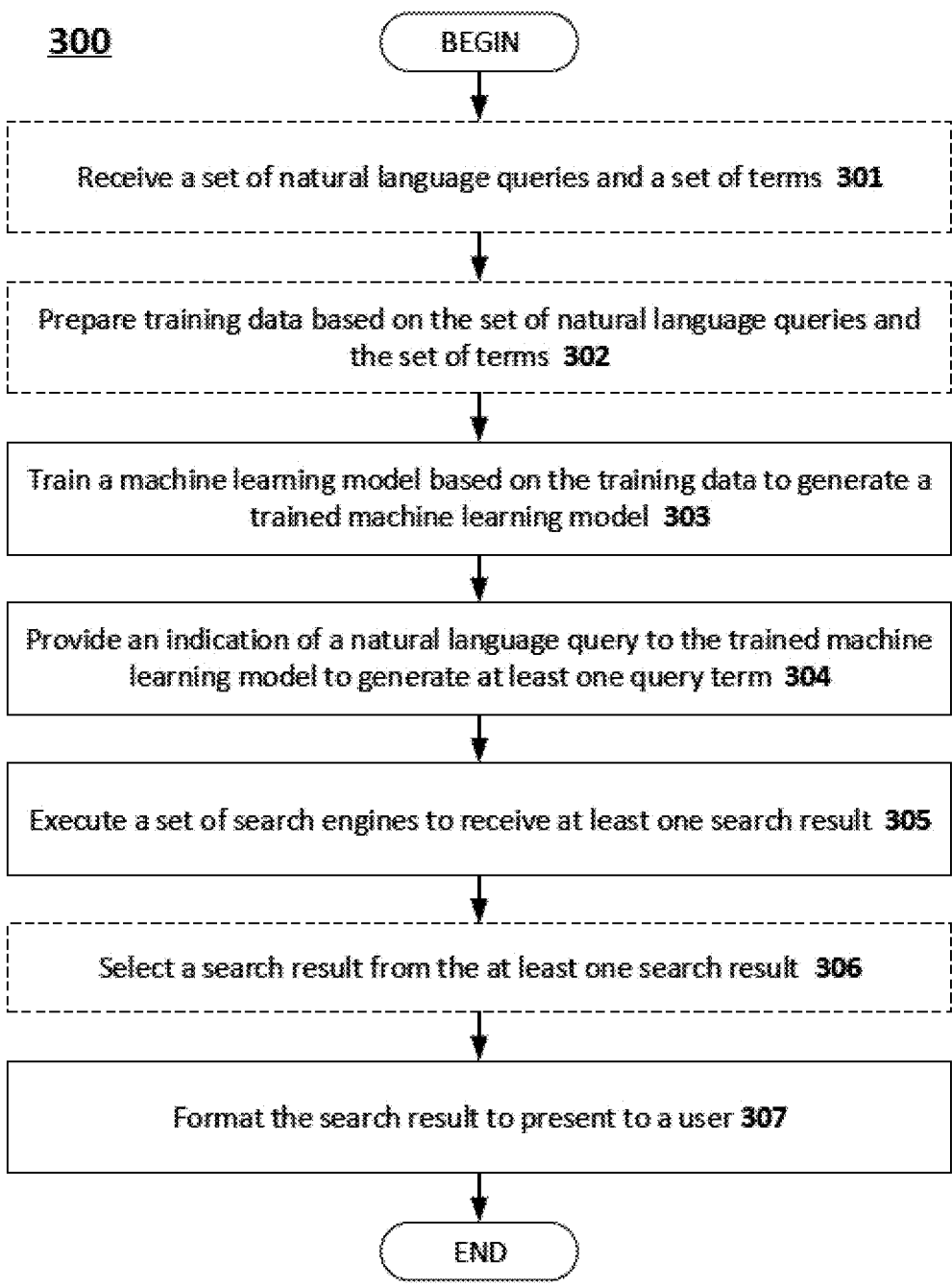
FIG. 3 is a flowchart illustrating a method for generating a formatted search result in response to a search query, according to an embodiment.

FIG. 3 is a flowchart illustrating a method 300 for generating a formatted search result in response to a natural language query, according to an embodiment. As shown in FIG. 3, the method 300 optionally includes, at 301, receiving a set of natural language queries and a set of terms, the set of terms can include a name of a person, a name of an object, or a title of an entity, or other information about which a user is conducting a search. The method 300 optionally includes, at 302, preparing training data based on the set of natural language queries and the set of terms. The method 300 further includes, at 303, training a machine learning model based on the training data to generate a trained machine learning model. The method 300 further includes, at 304, providing an indication of a natural language query to the trained machine learning model to generate a query term. The method 300 further includes, at 305, executing a set of search engines to receive at least one search result. The method 300 optionally includes, at 306, selecting a search result from the at least one search result. The method 300 further includes, at 307, formatting the search result to present to a user. The method 300 can be embodied in code and/or instructions stored in a memory (e.g., memory 102 of FIG. 1 or memory 222 of FIG. 2) that can be executed by a processor (e.g., processor 104 of FIG. 1 or processor 224 of FIG. 2).

At 301, a set of natural language queries can be received. The set of natural language queries can include multiple natural language queries. The set of natural language queries (e.g., 'What is the capital of Connecticut?', 'Where is Chichen-Itza?', 'What is thermonuclear fusion?', etc.) can include a one or more query terms (e.g., 'capital', 'Connecticut', 'Chicken-Itza', 'thermonuclear' 'fusion', etc.). The set of natural language queries can be provided from one or more query data sources. For example, a query data source can be a memory, a website, a server, a sensor, a user device, an application, a website, a database, a file system, a social network, or any other suitable source that can provide a query, a natural language query, or an indication of a natural language query. In some embodiments, the set of natural language queries can be provided by a keyboard via a graphical user interface (GUI), or by an application (app) via a network (similar to the network 150 shown in FIG. 1).

At 302, training data can be prepared based on the set of natural language queries (i.e., based on the multiple natural language queries). The set of natural language queries can be processed by a feature extraction method to identify and extract a set of features in the set of natural language queries and/or the set of query terms. For example, the set of features can include names, dates, interrogative words, currencies, physical units, places, latitude and longitude of a global positioning system (GPS), and/or the like. Each natural language query can be first converted to a set of words and/or characters including each individual word and punctuation mark in the natural language query. For example, the natural language query of 'What is thermonuclear fusion?' can be converted to the set of words and characters of 'what', 'is', 'thermonuclear', 'fusion', and '?'. The set of features can be then normalized to a common format and/or a common scale. For example, various physical units can be converted to an international system of units (SI). As another example, the set of features can be normalized by changing letters to a lower-case or upper-case, removing hyphens, removing suffixes and prefixes, normalizing verb tenses to a present tense, and/or the like. The set of natural language queries and/or the set of features can be associated with the set of query terms to prepare training data.

At 303, a machine learning model is trained based on the training data to generate a trained machine learning model. The machine learning model (similar to the word tagging model 112, word embedding model 114, and/or text-to-speech model 116) can be configured to analyze the training data to generate at least one query term from a natural language query. The machine learning model can include a set of model parameters including a set of weights, a set of biases, and a set of activation functions that, once trained, can be called a trained machine learning model, and can be executed to generate the at least one query term from the set of queries. The machine learning model can be a supervised or unsupervised machine learning algorithm and/or model. For example, the machine learning model can be an artificial neural network (ANN) configured to have an input layer, an output layer, and one or more hidden layers including a normalization layer, a dropout layer, and/or an activation layer. The machine learning model can be configured to iteratively receive each natural language query from the set of natural language queries of the training data and generate an output. Each natural language query from the set of natural language queries is associated with at least one query term of the training data. The output and the at least one query term can be compared by using an objective function (also referred to herein as the 'cost function' or the 'loss function') to generate a training loss. The objective function can include, for example, a mean square error, a mean absolute error, a mean absolute percentage error, a hinge, a logcosh, a categorical crossentropy, and/or the like. The set of model parameters can then be updated to reduce the training loss. The set of model parameters can be iteratively modified to reduce the training loss to converge to a predetermined threshold.

At 304, an indication of a natural language query is provided to the trained machine learning model to generate at least one query term and/or an indication of at least one query term. For example, a user (e.g., via a user device) can provide a natural language query to the query answering device 101 and/or user device 221. The trained machine learning model can then parse and/or analyze the natural language query and/or the set of words (e.g., using the trained machine learning model) to identify one or more terms. For example, the query answering device 101 and/or user device 221 can receive the natural language query 'What is thermonuclear fusion?', divide the natural language query to the set of words and characters of 'What', 'is', 'thermonuclear', 'fusion', and '?', and generate query terms 'thermonuclear' and/or 'fusion'.

At 305, a set of search engines are executed to receive at least one search result. The at least one query term and/or the indication of at least one query term can be input to the set of search engines to generate the at least one search result based on the at least one query term and/or the indication of at least one query term. The set of search engines can be predetermined or can be determined based on the natural language query. The set of search engines can also be specified by the user, network, and/or user devices. In some implementations, the set of search engines includes a local search engine within a user device (e.g., searching through data and files stored on the user's device). The set of search engines can be accessed via a predetermined set of websites. For example, the predetermined set of websites can include:

https://www.merriam-webster.com/dictionary/,
https://en.wikipedia.org/wiki/
https://unsplash.com/

In another example, the set of search engines can be determined dynamically, based on the natural language query. For example, the set of search engines for the natural language query of "what is a diffraction grating?" can be determined by a classifier program that classifies the natural language query to a specialization from a set predetermined of specializations (e.g., 'optics, 'electronics', 'legal', 'mythology', etc.). The specialization (e.g., 'optics') can be associated with a set of websites and/or a set of APIs that have access to a set of specialized search engines. The set of websites can include, for example:

https://www.nature.com/srep/
https://search.sciencemag.org/
http://spie.org/

The at least one query term can be used as an input to the set of websites, the set of APIs, the set of search engines, the set of specialized search engines, and/or the like. For example, the at least one query term of 'Connecticut' can be attached to a URL of a search engine 'en.wikipedia.org/wiki/' to receive an HTML webpage file. For another example, the term 'Connecticut' can be input as a query to a web-based search engine to receive links to one or more search results.

At 306, a search result can be selected from the at least one search result to generate a selected search result. Each result from the at least one search result can be assigned a score (also referred to herein as the 'likelihood of relevance'). The score can be assigned, for example, by counting a number of words in each search result that match the at least one query term, by calculating an average of distances of positions of words in the title of each search result in a word embedding from the position of the at least one query term in the word embedding, and/or other suitable methods to assign scores. The score for each search result from the at least one search result can then be compared to determine one or more search results with highest scores from the at least one search result. For example, in response to the query of 'Restaurants in London', a search result with page title of 'London's best restaurants' can be assigned a score of '2' for the words 'London' and 'restaurant' matching query terms 'London' and 'restaurant', and a search result with page title of 'Benares Indian Restaurant' can be assigned a score of '1' for the word 'restaurant' matching one of the query terms 'London' and 'restaurant'. The selected search result can be the search result with the highest score, relative to a predetermined score threshold and/or relative to the scores of a set of search results.

At 307, the selected search result is formatted to present at least one formatted search result to a user. A relevant part of the selected search result can be identified and/or extracted to generate the at least one formatted search result. For example, an entity identifier, such as the entity identifier 113 can identify and extract the relevant part of the selected search result. The relevant part of the selected search result can also be generated by removing extra content from the selected search result. The extra content that is removed can be, for example, an HTML script of the search result, textual content in brackets within the search result, textual content in parentheses within the search result, and/or the like. The formatted search result can be presented as a natural language response to the natural language query (e.g., by using a text-to-speech model similar to the text-to-speech model 116 of FIG. 1). Optionally, the formatted search result can also be converted to an audio signal (also referred to herein as 'audio message') using a text-to-speech model (similar to the text-to-speech model 116 of FIG. 1). Optionally, the formatted search result can include a media item and/or an indication of a media item. The media item can include an image, a text, a table, a table, an audio message, a video, a drawing, an animated drawing, and/or the like. The indication of the media item can include a link to a video, a link to an image, a link to a table, a link to a webpage, and/or the like. The media item can be formatted for an improved visual appearance and/or improved performance. For example, a video can be resized to load faster, or a photograph can be cropped for an improved visual appearance, when displaying the formatted result to a user and/or user device. The at least one formatted search result can be sent to the user (e.g., via a user device) for presentation to the user. In some embodiments, multiple formatted search results can be presented to the user. For example, a first formatted search result can be presented as a natural language response, a second formatted search result can be presented as an audio message, and a third formatted search result can be presented as an image.

Figure 4:
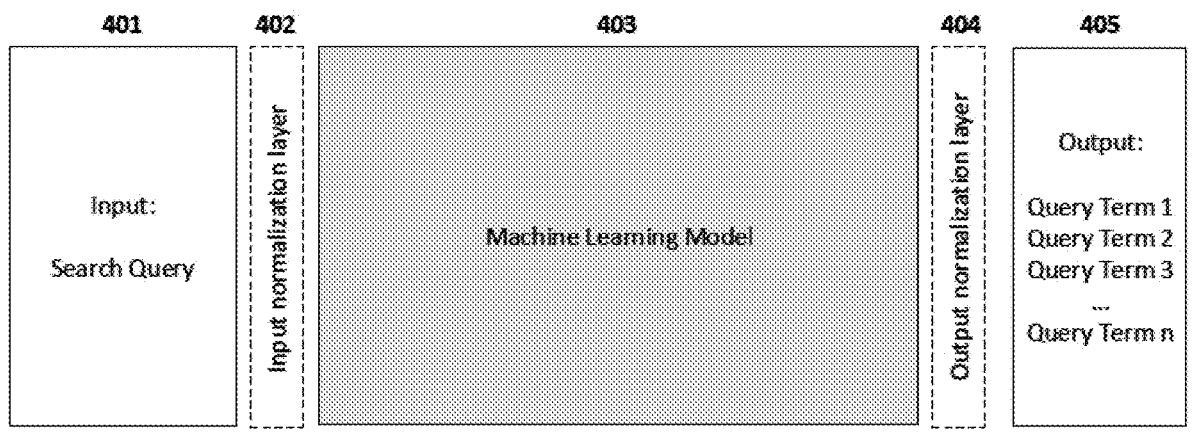
FIG. 4 is a diagram showing a machine learning model for generating a set of search terms in response to a search query, according to an embodiment.

FIG. 4 is a diagram showing a machine learning model 403 for generating a set of query terms 405 in response to a search query 401, according to an embodiment. The machine learning model 403 can be structurally and/or functionally similar to the word tagging model 112 of the query answering device 101. For example, the machine learning model 403 can be configured to generate the set of query terms 405 including a general term and a specific term. The machine learning model can be configured to include a part-of-speech (POS) tagging model (also referred to herein as 'word tagging model'). The POS tagging model can include at least one of a lexical based model (e.g., most frequently occurring word), a rule based model (e.g., words ending with 'ed' or 'ing' are verbs), a probabilistic model (e.g., a Hidden Markov Model), or a deep learning model (e.g., a Long Short Term Memory).

The machine learning model 403 can be configured to have an input normalization layer 402 to normalize the search query 401 to a common format and/or a common scale, and/or an output normalization layer 404 to normalize the set of query terms 405 to a common format and/or a common scale. For example, in some implementations, the search query 401 can be normalized by the input normalization layer 402 by converting letters to a common encoding (e.g., ASCII, UTF8, etc.).

The machine learning model 403 can include a set of model parameters including a set of weights, a set of biases, and/or a set of activation functions that, once trained, can be executed to generate the set of query terms from the search query. The set of activation functions can include, for example, a sigmoid function, a hyperbolic tangent function, a classifier function and/or the like. The machine learning model 403 can be executed iteratively to perform mathematical operations (e.g., addition, subtraction, multiplication, etc.) on the search query 401 and the set of model parameters 403 to predict a set of predicted query terms. The set of predicted query terms and the set of query terms can be used by a cost function to modify the set of model parameters of the machine learning model 403 in a way to reduce the cost function. The cost function can include, for example, a mean square error, a mean absolute error, a mean absolute percentage error, a hinge, a logarithmic hyperbolic cosine error, a categorical crossentropy, and/or the like.

The apparatus and methods described herein provide processor-readable mediums (e.g., memories such as memory 102 (FIG. 1) or memory 222 (FIG. 2)) for using machine learning to securely and efficiently retrieve and present search results to a user. The processor-readable medium can store code representing instructions to be executed by a processor. The instructions can include code to cause the processor to receive a natural language query and provide a natural language response. The instructions can also include code to cause a machine learning model to transform the natural language query to a set of query terms, which can be input to a search engine to generate a set of search results. The instructions can further include code to identify at least one relevant part of the set of search results based on the set of query terms, and then transform the at least one relevant part as a natural language response to the natural language query. Said another way, the instructions can cause the processor to receive a natural language query from a user and return formatted information intended to answer the question posed in the natural language query and/or to inform the user about topics specified in the natural language query. An example natural language query can be "What does vitriolic mean?" and part of the natural language response can include "Vitriolic means filled with bitter criticism or malice".

The instructions also include instructions to cause the processor to return the formatted information to a variety of users, including users with physical, intellectual, visual, or hearing impairments. The instructions also include instructions to protect the user's data, user's privacy, and/or user device by not executing code and/or programs on websites or other sources identified when executing the search engine.

Figure 5A:
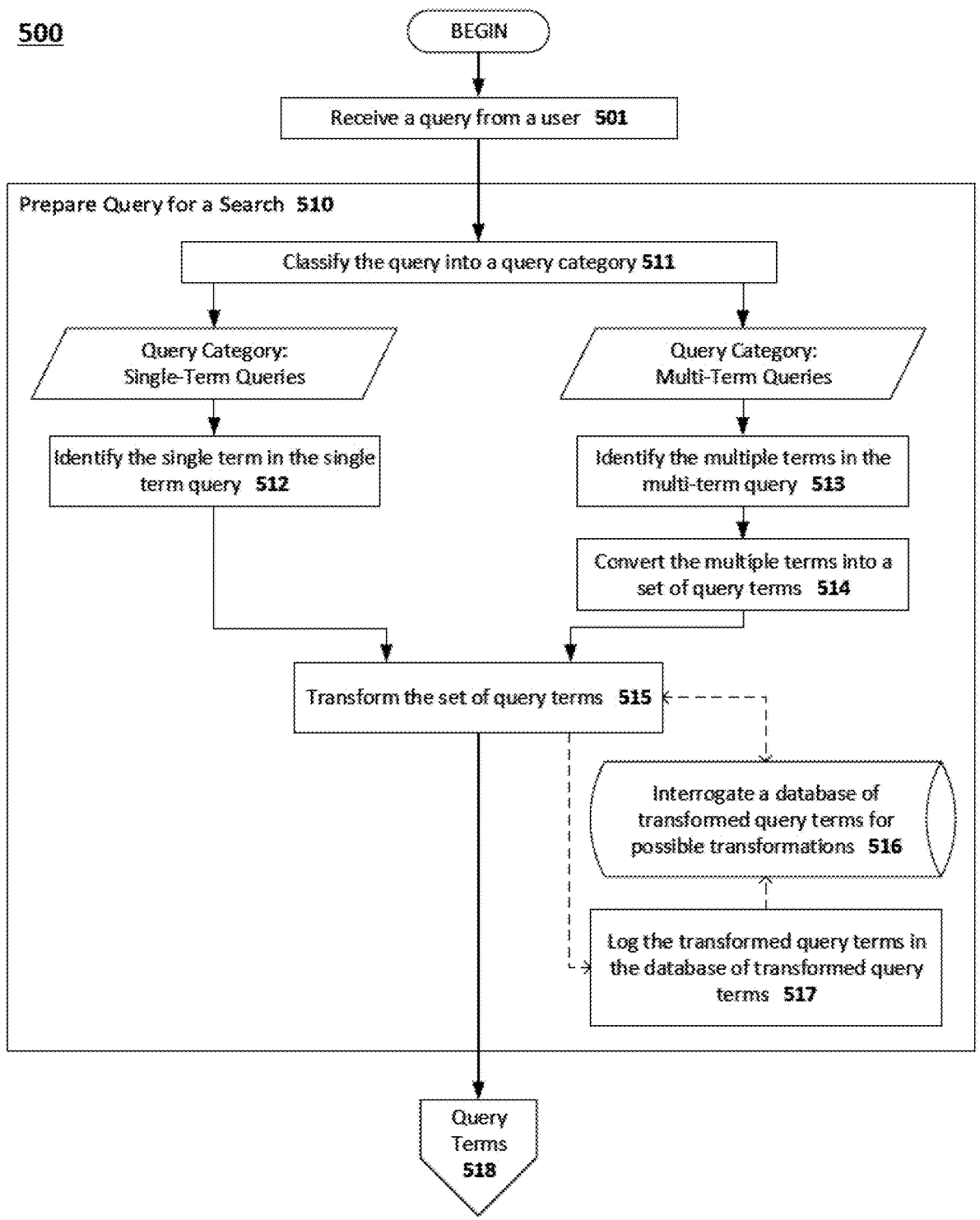
FIGS. 5A to 5C include a flowchart illustrating a method for generating and executing a formatted search results in response to a search query, according to an embodiment.
Figure 5B:
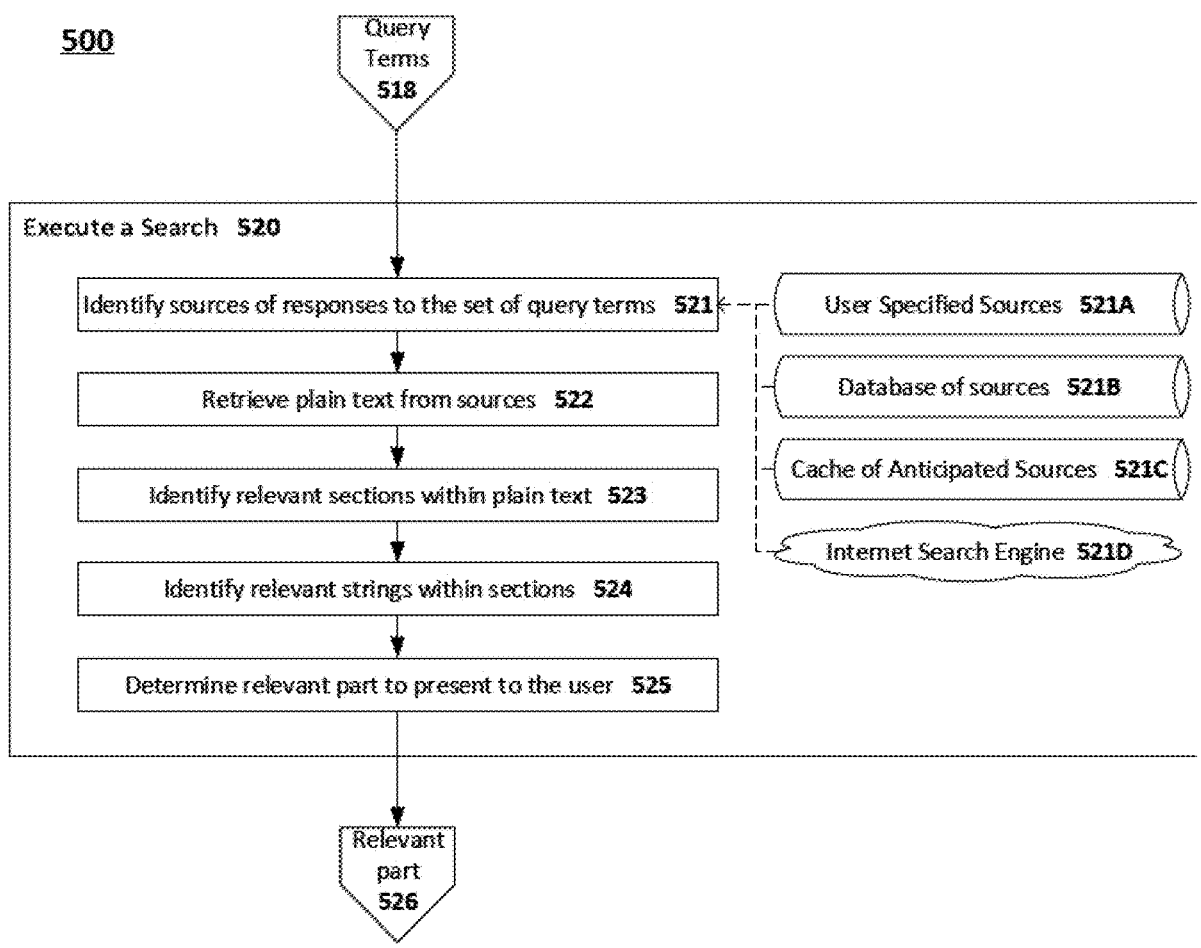
Figure 5C:
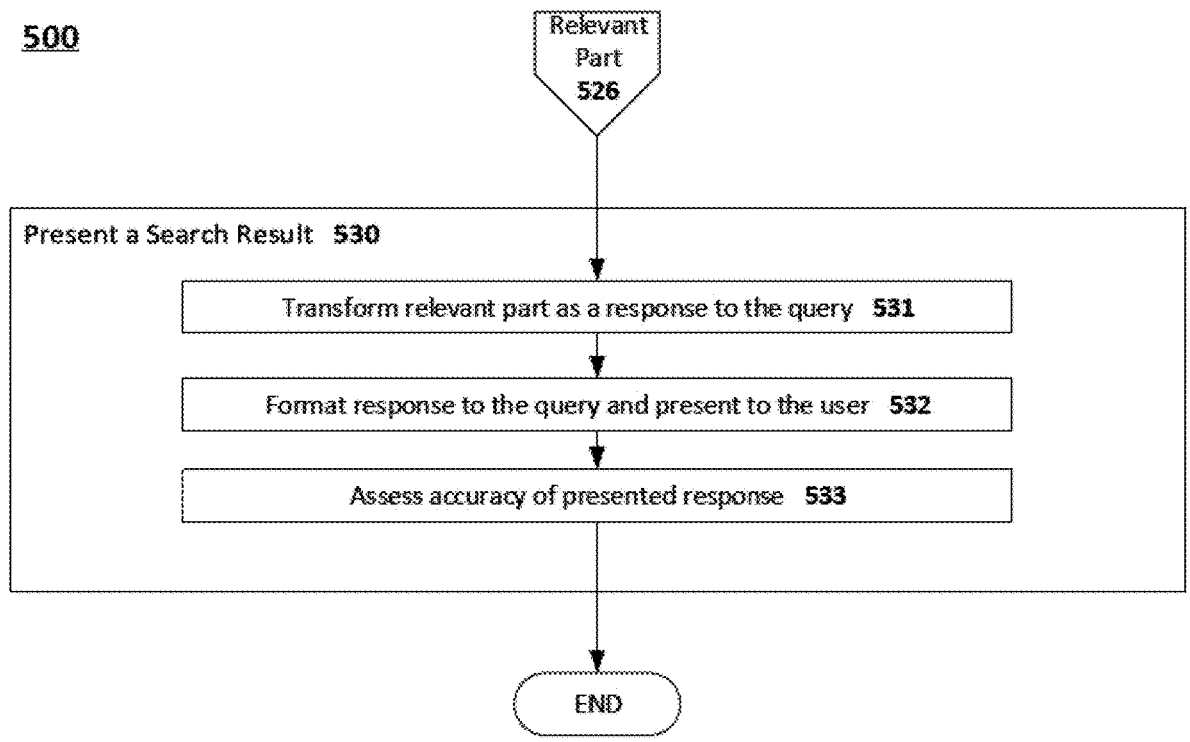

FIGS. 5A to 5C include a flowchart illustrating a method 500 for generating and executing a formatted search result in response to a search query. The method 500 can be executed by a processor (such as processor 104 or processor 224, shown and described above with respect to FIGS. 1 and 2, respectively). The method 500 can be stored on a processor-readable medium, such as a non-transitory processor-readable medium. In some embodiments, the processor-readable medium is similar in function and/or structure to the memory 102 of FIG. 1 and/or the memory 222 of FIG. 2. In some embodiments, the processor can be the functionally and/or structurally similar to the processor 104 of FIG. 1 and/or the processor 224 of FIG. 2.

As shown in FIG. 5A to 5C, the method 500 includes, at 501, receiving a query from a user and then, at 510, preparing the query for a search. The method 500 also includes, at 520, executing a search (FIG. 5B) and then, at 530, presenting a search result (FIG. 5C).

At 501, the method 500 includes receiving a query from a user. A query can be expressed as a natural language query, an indication of a natural language query, or any other suitable query for interrogating a search engine or similar information retrieval system. Examples of queries include, but are not limited to, a question to be answered or a general topic that the user wants to know more about. The processor can receive the query through any suitable means. In some embodiments, the user can input the query to the processor through a graphical user interface (GUI). The GUI can be configured to emphasize that the query should be formatted as a natural language query. In some embodiments, the GUI can be configured to present a set of natural language queries and/or a set of indications of natural language queries from which the user can select a natural language query to be received by the processor.

In some implementations, the processor can also be instructed to identify a set of contextual queries based on a set of contextual information about the user. The set of contextual information can include the user's location (e.g., using global position system (GPS)), the user's demographics, the current date and time, the user's internet account profiles, the user's calendar, the user's email, the user's address book, user data from the user's wearable devices (e.g., smart watch, smart phone), and/or similar sources of contextual information about the user. In some embodiments, the set of contextual information can include the user's preferences, such as the user's likes and dislikes. As an example, a query generated from the set of contextual information can include asking for directions, asking for the history of the user's current location, asking for personal information about the user, asking about current events, asking about scheduled events, asking about health information, and other similar queries that involve the set of contextual information about the user. The processor can be instructed to identify a set of contextual natural language queries based on a set of contextual information about the user. A query can be generated from the set of contextual information from a collection of commonly used, predetermined queries. For example, the natural language query "where am I?" can be a commonly used, predetermined query and can use the location received from the user's device (e.g., GPS device). More complex implementations can use advanced methods (e.g., using a machine learning model) to generate a set of natural language queries from the set of contextual information about the user.

In some embodiments, the processor can be instructed to receive at least one of a history of executed search results, a history of natural language queries, a history of query terms, a history of natural language responses, a history of indications of natural language queries, and/or a history of indications of natural language responses to identify a set of relevant natural language queries. For example, the processor can be instructed to generate the relevant natural language query by allowing the user to select a previously executed search result and/or an indication of a previously executed search result. The history of executed search results can be in any suitable form, such as a cache of search results. For example, after the method 500 has presented a first search result (as described in further detail herein), the user can select a portion of that search result to be a second query (e.g., the relevant natural language query) to be received by the processor.

In some embodiments, the processor can be instructed to identify key terms from the first set of search results, and then transform the set of key terms to a set of potential natural language queries. In some embodiments, a machine learning model such as a word tagging model (e.g., a word tagging model similar to the word tagging model 112 shown and described with respect to FIG. 1) can analyze a history of executed search results, a history of natural language queries, a history of query terms, a history of natural language responses, a history of indications of natural language queries, and/or a history of indications of natural language responses to identify key terms such as people, places, entities, nouns, and/or other important words or phrases to generate a second query (e.g., the relevant natural language query) and/or set of potential natural language queries. The second query can be selected from the set of potential natural language queries. In some embodiments, the machine learning model can be configured to analyze at least a portion of the textual resources identified by the executed search engine to generate a second query (e.g., the relevant natural language query). In some embodiments, the machine learning model can be configured to order the identified words and phrases based on the relevance of the identified words and phrases to a history of executed search results, a history of natural language queries, a history of query terms, a history of natural language responses, a history of indications of natural language queries, and/or a history of indications of natural language responses to identify the set of relevant natural language queries. In some embodiments, the user is presented with a set of relevant natural language queries and/or a set of indications of relevant natural language queries to be received by the processor, from which the user can select a second query to be received by the processor.

At 510, the method 500 includes preparing the query for a search, which will result in a set of query terms 518. The steps for preparing the query for a search include, at 511, classifying the query into a query category, such as a single term query or as a multi-term query. For single-term queries, the method 500 includes, at 512, identifying the single term in the single term query. For multi-term queries, the method includes, at 513, identifying the multiple terms in the multi-term query and then, at 514, converting the multiple terms into a set of query terms. The instructions further include, at 515, transforming the set of query terms. The instructions also include, at 516, interrogating a database of transformed query terms for possible transformations, and at 517, logging the transformed query terms in the database of transformed query terms.

At 511, the method 500 classifies the query into a query category. The query (e.g., a natural language query) can be classified into any suitable number of query categories that can help prepare the query for a search and/or to parse the components of the query into a set of query terms. The processor can be instructed to use any suitable process and/or model to classify the query into a query category. For example, a query can be classified using a set of machine learning models such as a word tagging model (e.g., a word tagging model similar to the word tagging model 112 shown and described with respect to FIG. 1) or a text classification model. Example query categories can include, but are not limited to, a "single-term query", "multi-term query", "convertible to single-term query", "simple query", "complex query", "contextual query" (i.e., based on the contextual information about the user), and so forth. Single-term queries are queries including a single word, a single phrase, and/or a singular topic. Example single-term queries include "Taj Mahal", "Photosynthesis", "SHA-256 hash function", and "A Midsummer Night's Dream". Single-term queries can also be generated from natural language queries. For example, a query that uses natural language to refer to a single word, single phrase, and/or singular topic. In some embodiments, single-term queries that can be generated from natural language queries can be classified as a "convertible to single-term query". Single-term queries can be generated from natural language queries using any suitable method of transformation (e.g., a machine learning model such as a word tagging model or a text classification model). Example natural language queries that can be converted to a single-term query include "What is the Taj Mahal?", "Please give me some general information about photosynthesis", "What does the SHA-256 hash function do?", "Tell me about A Midsummer Night's Dream". Complex queries are queries that are not as easily reduced to a single word, single phrase, and/or singular topic. Queries that are not complex queries can be categorized as "Simple Queries". In some embodiments, complex queries can be a query for specific information within a singular topic (i.e., a query for more than just general information about a topic). Complex queries can also ask about multiple topics. Example complex queries include "How many people visit the Taj Mahal each year?", "Do plants need water to perform photosynthesis?", "When was the SHA-256 hash function proposed?", "What were the main themes of A Midsummer Night's Dream?"

At 512, for queries classified as a single-term query, the method 500 can identify the single term in the single-term query. For example, the method 500 can identify the single term "photosynthesis" in the natural language query "Give me some general information about photosynthesis, please". As described above, the single term in the single-term query can be a single word, single phrase, and/or singular topic. The processor can identify the single term using any suitable method of transformation, such as, for example, a machine learning model, pre-determined rules, methods based on heuristics, and/or lexical analysis. In some embodiments, a machine learning model such as a word tagging model (e.g., a word tagging model similar to the word tagging model described at 511) or a text classification model (e.g., a text classification model similar to the text classification model described at 511) can be configured to identify the single term, single phrase, and/or singular topic of the single-term query. For the example, the word tagging model can indicate that the words "Give", "me", "some", "general", "information", "about", and "please" do not include a portion of the single term in the phrase "Give me some general information about photosynthesis, please". The identified single term, single phrase, and/or singular topic of the single-term query can form a set a query terms to be executed by the search (at 520 as described in further detail herein). In some implementations, the machine learning model can be configured to remove and/or transform a portion of the single-term query to generate the set of query terms to be executed by the search (at 520 as described in further detail herein).

At 513, for queries classified as multi-term queries, the method 500 can identify the multiple terms in the multi-term query. Each term in the set of multiple terms can be a single word, single phrase, and/or singular topic. In some embodiments, the processor can be configured to use a machine learning model (e.g., a word tagging model similar to the word tagging model 112 shown and described with respect to FIG. 1) to identify the set of multiple terms, also called "normalization". For example, the query can be tokenized by word and/or phrase. Punctuation marks or other indicators can also be used as tokens. Then the generated tokens can be received by a word tagging machine learning model to identify tokens that should be preserved when converting the multiple terms into a set of query terms (at 514). This machine learning model can be trained with human-selected and/or tagged outputs that, based on research and/or trial and error, can be shown to enhance converting the multiple terms into a set of query terms (at 514). In some implementations, the processor and/or machine learning model can track the quantity and the order of the tokens identified to be preserved by the word tagging model.

At 514, for queries classified as multi-term queries, the method 500 can convert the multiple terms into a set of query terms. The multiple terms can be previously identified using normalization (at 513). The processor can convert the multiple terms into a set of query terms to be executed by the search (at 520). The method 500 can convert the multiple terms into a set of query terms using any suitable process and/or model of conversion, such as, for example, a machine learning model. In some embodiments, a Seq2Seq machine learning model is used to convert the multiple terms (e.g., the identified multiple terms during normalization and/or the identified tokens to be preserved during normalization) to the set of query terms. The Seq2Seq machine learning model can be trained with sets of queries (gathered from real user queries, or otherwise obtained) and associated outputs of query terms. The Seq2Seq machine learning model can be trained to preserve important aspects of the set of queries, such as aspects of the question that is being asked. The Seq2Seq machine learning model can be trained to provide a set of query terms that yield relevant results when executing a search (at 520). The Seq2Seq machine learning model can be trained to account for the quantity and order of the tokens identified during normalization (at 513). For example, in some implementations, the Seq2Seq machine learning model can return a set of query terms such that quantity and order of the set of query terms corresponds to the quantity and order of tokens identified during normalization.

In some instances, the Seq2Seq machine learning model can receive multiple terms that the Seq2Seq machine learning model has not yet been trained to account for when generating a set of query terms. Thus, in some implementations, the multiple terms to be received by the Seq2Seq machine learning model can be substituted for a set of placeholder terms and/or placeholder tokens that the Seq2Seq machine learning model has been trained to account for when generating a set of query terms. For example, the Seq2Seq machine learning model can be trained to generate a set of query terms that include the placeholder terms and/or placeholder tokens that were received by the Seq2Seq machine learning model. After a set of query terms that includes the placeholder terms and/or placeholder tokens has been generated, the placeholder terms and/or placeholder tokens can then be substituted back to the multiple terms.

The processor can determine the set of multiple terms to be substituted for a set of placeholder terms and/or placeholder tokens using any suitable process and/or model, such as, for example, a separate machine learning model (e.g., a word tagging model similar to the word tagging model 112 in FIG. 1), pre-determined rules, methods based on heuristics, and/or lexical analysis. For example, the processor can determine the set of multiple terms to be substituted for the set of placeholder terms and/or placeholder tokens by selecting the multiple terms with the same grammatical properties (e.g., having the same part-of-speech, such as a noun or name), selecting the multiple terms that are not included in the vocabulary and/or training data of the Seq2Seq machine learning model, selecting the multiple terms that contain uncommon words and/or phrases, selecting the multiple terms that have previously generated an incorrect set of query terms.

Substituting multiple terms with placeholder terms and/or placeholder tokens solves a common problem with Seq2Seq models—they can lose track of, or improperly translate to the output, uncommon query terms and/or query terms that are not in their vocabulary. The training data for the Seq2Seq model can be generated from human effort, from a history of accurate search results, and/or from synthesized data. In some implementations, one or more words in the input and output that are the same part of speech (e.g., nouns or adjectives, as identified by a machine learning model) and refer to the same term, phrase, or topic can also be accounted for by the Seq2Seq machine learning model using the same method as described to account for the quantity and order of tokens identified during normalization.

At 515, the method 500 can optionally include transforming the set of query terms. This transformation is also referred to herein as "Dynamic Substitution". As described above, dynamic substitution can be applied to any set of query terms from any category of queries classified (at 511). The method 500 can use any suitable method or process to transform the set of query terms, including methods based on heuristics, machine learning models, lexical analysis, and pre-determined rules. Transforming the set of query terms can include adding additional terms to the set of query terms, replacing terms in the set of query terms, and/or removing terms from the set of query terms (e.g., to provide context for the query and yield more relevant search results). Example context provided by dynamic substitution can include the date, time, location, abbreviations, spelling corrections, and so forth. For example, the query term "today" can be replaced by query terms specifying the present date. As another example, the query term "$40^{th}$ president" can be transformed to "$40^{th}$ president of the United States" if the user is located in the United States. As another example, the abbreviated query term "CT" can be transformed to "Connecticut". As another example, the misspelled query term "Taj amhal" can be transformed to "Taj Mahal". In some embodiments, the dynamic substitution can use a word tagging machine learning model (e.g., a word tagging model similar to the word tagging model described at 511). In some embodiments, the dynamic substitution uses a machine learning model to categorize query terms based on whether a transformation can be applied to the query terms. In some embodiments, the dynamic substitution can execute a search engine to find suitable query terms. For example, the processor can be configured to search for the definition of the abbreviation "CT" using a search engine (such as an internet search engine) to receive the query term "Connecticut".

In some embodiments, the method 500 can include, at 516, interrogating a database of transformed query terms for possible transformations to be used during dynamic substitution. In some embodiments, the database is a curated database with common transformations, such as common abbreviations, common spelling mistakes, and/or commonly used transformations. The common transformations can be generated by the user or by a set of users. In some embodiments, the processor can be instructed to, at 517, log the transformed query terms in the database of transformed query terms. The database of transformed query terms can be located on the user's device (e.g., within the processor-readable medium) or outside the user's device and accessible by a network (e.g., a server). When logging the transformed query terms to the database of transformed query terms, the processor can also be instructed to log the untransformed query term and/or metadata about the transformation. In some implementations, the database of transformed query terms can be used as training data to further train a machine learning model used as part of dynamic substitution (at 515).

Referring to FIG. 5B, at 520, the method 500 can include executing a search using the set of query terms 518, which can result in presenting a relevant part 526 to the user. Executing a search can include, at 521, identifying sources of responses to the set of query terms, such as a set of user specified sources 521A, a database of sources 521B, a cache of anticipated sources 521C, and a set of internet search engines 521D. The method 500 also includes, at 522, retrieving plain text from the sources and then, at 523, identifying relevant sections within the plain text. The method 500 can, at 524, identify relevant strings within sections and then, at 525, determine a relevant part to present to the user.

At 521, the method 500 includes identifying sources of responses to the set of query terms. As shown in FIG. 5B, example sources of responses can include a set of user specified sources 521A, a database of sources 521B, a cache of anticipated sources 521C, and a set of internet search engines 521D. In some embodiments, the set of internet search engines 521D is predetermined. In some embodiments, the method 500 can include executing a set of search engines (e.g., the set of search engines 521D) and/or similar information retrieval system based on the set of query terms to identify the sources of responses. For example, the sources of responses can be extracted from a set of search results generated by the executed search engine (e.g., as a list of links to webpages). In some embodiments, the search engine can generate a set of search results by interrogating a curated knowledge base, such as the database of sources 521B. The curated knowledge base can be designed to provide commonly used sources by the user and/or a set of users. In some embodiments, the user can specify one or more sources (e.g., the user specified sources 521A), such as a website URL, which can be identified as a source of responses. For instance, if a user wants to learn about photosynthesis, and knows of a website about photosynthesis, the user can select to use that website as a source when executing a search. In some embodiments, the user can identify one or more files to be a source of responses (e.g., as part of the user specified sources 521A). For example, the files can be hypertext markup language (HTML) content of webpages, HTML files, rich-text formatted files, portable document format (PDF) files, word processing documents, emails, e-books, images of text, or any other suitable source of response. The method 500 can thus use any suitable source of responses provided by the user. For example, the method 500 can include scanning the contents of a long email to answer a user's query about the date of a certain event. As another example, the method 500 can include scanning a PDF of a specialized book and then answering questions about the subject. The database of sources can be any database of sources that can provide a source of responses to the set of query terms. The cache of anticipated sources 521C can be generated from the user's history of natural language queries, history of natural language responses, history of query terms, history of executed search results, contextual information about the user, and/or any other source. The method 500 can include caching sources based on the content of a query as the query is received by the processor (e.g., as the user is entering a natural language query to the GUI). The set of internet search engines 521D can be a set of any internet search engine, or a set of internet search engines specified by the user. The user can also specify sources of responses that should not be used when executing a search. The user may also configure a custom search engine by providing a URL where the query terms can be inserted.

At 522, the method 500 includes retrieving plain text from the sources. For example, the plain text can be extracted from hypertext markup language (HTML) content of webpages, HTML files, rich-text formatted files, portable document format (PDF) files, word processing documents, emails, e-books, or images of text, or any other suitable text source. In some embodiments, the set of plain text can be retrieved from the set of search results generated by an executed search engine based on the set of query terms. The method 500 can be configured to convert a source to plain text from the original text format of the source. In some embodiments, the method 500 can be configured to interpret links or references to the source as strings or sequences of bytes. Furthermore, the method 500 can be configured to not run code contained within the source. As an example, a processor can be configured to retrieve the raw HTML content of webpages, but not run any HTML code or other code (e.g., JavaScript) contained within the source when retrieving and analyzing the source. Further, in some implementations, when retrieving the source, the method 500 does not send information back to the website or other database or sources. Thus, the method 500 can avoid compromising the user's data by not interacting with, for example, third-party internet trackers, internet advertising, phishing sites, and internet malware. Specific sources may format their information consistently, and the method 500 can use heuristics or any other suitable process to extract a portion of plain text from the source in a consistent and desired manner. In some embodiments, the method 500 can compress the set of plain text to generate a set of compressed plain text. The method 500 can use any suitable means to compress the set of plain text, such as using UTF-8 encoding.

At 523, the method 500 can identify relevant sections within the plain text. In some embodiments, the method 500 can identify relevant sections within a set of compressed plain text. The method 500 can use heuristics, a machine learning model, or any other suitable means to identify relevant sections within the plain text. For example, the method 500 can use a word embedding machine learning model (e.g., similar to word embedding model 114 (FIG. 1) or word embedding model 214 (FIG. 2)) to identify relevant sections within the plain text. The word embedding model can include a file containing a vocabulary of words, each associated with a vector, that can be compared to determine how similar a set of words are to each other. The method 500 can use at least one of the query terms in the word embedding and store their associated vectors in memory. The method 500 can scan the set of plain text retrieved from the sources to identify words and compute an associated vector for those words, which can be compared to the vectors associated with the query terms using the word embedding model. The method 500 can identify a set of relevant sections within the set of plain text that includes a substantial portion of the words related to the query terms (based on the word embedding model).

At 524, the method 500 includes identifying a set of relevant strings within the set of relevant sections. The method 500 can use any suitable process and/or model (e.g., a machine learning model) to identify the set of relevant strings within the set of relevant sections. In some embodiments, the set of relevant strings can be identified using a Bidirectional Encoder Representations from Transformers (BERT) machine learning model. The BERT model can use the set of relevant sections and set of query terms to identify the set of relevant strings within the relevant sections. In some embodiments, the BERT model uses a portion of the set of query terms. The BERT model can be invoked for the relevant section(s) in the set of relevant sections.

At 525, the processor is instructed to determine a relevant part and/or portion to present to the user, resulting in the relevant part 526. The relevant part 526 can be chosen from the set of relevant strings and/or the set of relevant sections. The method 500 can use any suitable process and/or model (e.g., a machine learning model) to select the relevant part from the set of relevant strings and/or the set of relevant sections. In some embodiments, the method 500 can select the relevant part based on the reputability of the associated source. The reputability of the source can be determined by any suitable process (e.g., by consulting a server with reputability information). In some embodiments, the relevant part can be selected based on the similarity of the relevant part to the other strings in the set of relevant strings. In some embodiments, the processor can be instructed to rank the reputability of the set of relevant strings. For example, by storing the accuracy assessments retrieved when presenting the search result (at 530).

Referring to FIG. 5C, at 530, the method 500 can present a search result to a user using the relevant part 526. The steps for presenting a search result can include, at 531, transforming the relevant part as a response to the query and then, at 532, formatting the response to the query and presenting the formatted response to the user. The method 500 can also include, at 533, assessing the accuracy of the presented response.

At 531, the method 500 includes transforming the relevant part 526 as a response to the query. The method 500 can include transforming the relevant part 526 into a response expressed as an answer the question(s) posed in the query, or as information about topics specified in the query. The relevant part 526 can be transformed into a response to the query using any suitable process and/or model, such as, for example, a machine learning model, pre-determined rules, methods based on heuristics, and/or lexical analysis. In some embodiments, the response to the query can be stored as text, such as plain text. In some embodiments, the response to the query is a natural language response.

At 532, the method 500 can format the response to the query and present the formatted response to the user or send a signal to a user device to present the formatted response to the user. The formatted response can be in any suitable form, such as a natural language response, and/or an indication of a natural language response. In some embodiments, the response to the query is formatted in a consistent manner such that relevant parts from sources are consistently presented. In some embodiments, the formatted response can include relevant text, relevant images, relevant tables, relevant audio messages, and/or other relevant media. In some embodiments, the method 500 can include executing an auxiliary search engine to identify and/or retrieve, based on the query terms, a relevant set of images, set of tables, set of audio messages, set of videos, or other media as part of the formatted response. In some embodiments, the method 500 can include formatting the response in a manner that is accessible by assistive technology, such as a screen reader, magnifier, or other similar assistive technology. For example, the formatted response can include text-to-speech compatible data that can be used by a screen reader (e.g., to present the formatted response in as an audio message). In some embodiments, the formatted response can include a font, font color, font size, and contrast that is accessible by a wide range of users, including users with visual impairments. In some embodiments, the user can instruct the processor to make the text bigger or smaller. If images or videos are presented as part of the formatted response, captions and/or audio descriptions can be provided to describe the images and/or video. In some embodiments, the formatted response can be presented to the user via the user's device (e.g., the user device 121 as described in FIG. 1 and/or the user device 221 as described in FIG. 2) in response to receiving a signal with the formatted response from a query answering device (e.g., query answering device 101 of FIG. 1). For example, the formatted response can be presented to the user on a screen of the user's device, through speakers on the user's device, and/or any other output of the user's device. In some embodiments, the formatted response can be presented to the user's device via a network (e.g., the network 150 as described in FIG. 1 and/or the network 250 as described in FIG. 2).

At 533, the method 500 can include optionally assessing the accuracy of the presented response. The method 500 can assess the accuracy of the presented response using any suitable process and/or model, such as a survey, a like button, or a machine learning model (e.g., by analyzing the user's history of queries). For example, a survey can be presented to the user on how relevant the presented response was to the user's query. As another example, a user can be presented with a like button such that the user can select to express that they like, enjoy, recommend and/or support the presented response based on how relevant the presented response was to the user's query. In some implementations, a dislike button can accompany the like button such that the user can select to express that they dislike and/or do not recommend the presented response based on how relevant the presented response was to the user's query. In some embodiments, the method 500 can determine the accuracy of the natural language response to the natural language query. The accuracy of the presented response (e.g., the accuracy of the natural language response) can be used to the train machine learning models used within the method 500.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

Some embodiments described herein relate to computer-readable medium. A computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, PLDs, ROM and RAM devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Swift, Objective-C, Java, JavaScript, C++, and/or other programming languages and development tools. Additional examples of computer code include, but are not limited to, control signals, encrypted code, and compressed code.

All combinations of the foregoing concepts and additional concepts discussed herein (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, and otherwise) shows, by way of illustration, various embodiments in which the embodiments can be practiced. The advantages and features of the application are of a representative sample of embodiments only, and are not exhaustive and/or exclusive. They are presented to assist in understanding and teach the embodiments.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is provided as an example and equivalents, regardless of order, are contemplated by the disclosure.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

It should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes can be made without departing from the scope of the disclosure.

What is claimed is:

1. An apparatus comprising:
a memory; and
a processor operatively coupled to the memory,
the processor configured to provide an indication of a natural language query to a machine learning model such that the machine learning model provides a general term and a specific term based on the natural language query, the general term identifying a categorical concept of the natural language query and the specific term being an attribute of the general term;
the processor configured to execute at least one predetermined search engine based on the general term to generate a set of search results;
the processor configured to identify a plurality of query terms associated with the specific term and based on a word embedding model, the word embedding model identifying the plurality of query terms as a set of terms similar to the specific term based on a position of each term from the set of terms in the word embedding model relative to a position of the specific term in the word embedding model;
the processor configured to identify relevant parts in each search result from the set of search results based on the plurality of query terms;
the processor configured to assign an indication of likelihood of relevance of each search result from the set of search results to the specific term based on the relevant parts in that search result; and
the processor configured to select a search result from the set of search results based on the indication of likelihood of relevance of the search result.

2. The apparatus of claim 1, wherein the processor is configured to:
receive a plurality of natural language queries, each natural language query associated with a set of query terms; and
train the machine learning model based on the plurality of natural language queries and the set of query terms.

3. The apparatus of claim 1, wherein the machine learning model includes part of speech (POS) tagging.

4. The apparatus of claim 1, wherein the processor is configured to:
generate the word embedding model based on at least one of a domain-specific corpus or a language-specific corpus.

5. The apparatus of claim 1, wherein the word embedding model is generated by a compute device different from the processor and is stored in the memory.

6. A method, comprising:
receiving a plurality of natural language queries, each natural language query from the plurality of natural language queries corresponding to at least one query term from a plurality of query terms;
defining training data including the plurality of natural language queries and the plurality of query terms;
training a machine learning model based on the training data;
providing an indication of a natural language query as an input to the machine learning model such that the machine learning model outputs a general term and a specific term, the general term identifying a categorical concept of the natural language query and the specific term being an attribute of the general term;
executing at least one predetermined search engine to generate at least one search result based on the general term; and
identifying a plurality of query terms associated with the specific term and based on a word embedding model, the word embedding model identifying the plurality of query terms as a set of terms similar to the specific term based on a position of each term from the set of terms in the word embedding model relative to a position of the specific term in the word embedding model; and
extracting a relevant part from the at least one search result based on the plurality of query terms to generate at least one formatted search result.

7. The method of claim 6, further comprising:
presenting the at least one formatted search result;
performing text-to-speech processing on the at least one formatted search result to generate at least one audio message; and
presenting the at least one audio message.

8. The method of claim 6, wherein the at least one formatted search result includes at least one of a text, an image, a table, an audio message, or a video.

9. The method of claim 6, wherein the machine learning model includes part of speech (POS) tagging.

10. A non-transitory processor-readable medium storing code representing instructions to be executed by a processor, the instructions comprising code to cause the processor to:
receive a natural language query;
classify the natural language query into a query category from a set of possible query categories;
input the natural language query to a machine learning model such that the machine learning model provides a set of query terms based on the natural language query and the query category;
execute a predetermined search engine based on the set of query terms to generate a set of search results;
retrieve a set of plain text from the set of search results by extracting the set of plain text from at least one of hypertext markup language (HTML) content of webpages, HTML, files, rich-text formatted files, portable document format (PDF) files, word processing documents, emails, e-books, or images of text;
identify a relevant part from the set of plain text based on the set of query terms; and
transform the relevant part as a natural language response to the natural language query.

11. The non-transitory processor-readable medium of claim 10, further comprising code to cause the processor to:

execute an auxiliary search engine to identify at least one of a set of images, a set of audio messages, or a set of videos based on the set of query terms; and retrieve at least one of a relevant image from the set of images, a relevant audio message from the set of audio messages, or a relevant video from the set of videos.

12. The non-transitory processor-readable medium of claim 10, further comprising code to cause the processor to:

determine an accuracy of the natural language response to the natural language query; and train the machine learning model based on the natural language query, the query category, the set of query terms, the natural language response, and the accuracy of the natural language response.

13. The non-transitory processor-readable medium of claim 10, wherein the set of possible query categories includes single-term queries and multi-term queries.

14. The non-transitory processor-readable medium of claim 10, wherein the natural language query is a first natural language query, the query category is a first query category, the set of query terms is a first set of query terms, the set of search results is a first set of search results, the set of plain text is a first set of plain text, the relevant part is a first relevant part, and the natural language response is a first natural language response, the code further comprising code to cause the processor to:

identify a set of key terms from the first set of search results;

transform the set of key terms to a set of potential natural language queries;

select a second natural language query from the set of potential natural language queries;

classify the second natural language query into a second query category from the set of possible query categories;

input the second natural language query to the machine learning model such that the machine learning model provides a second set of query terms based on the second natural language query and the second query category;

execute the predetermined search engine based on the second set of query terms to generate a second set of search results;

retrieve a second set of plain text from the second set of search results;

identify a second relevant part from the second set of plain text based on the second set of query terms; and transform the second relevant part as a second natural language response to the second natural language query.

15. The non-transitory processor-readable medium of claim 10, wherein the natural language query is a first natural language query, the code further comprising code to cause the processor to:

retrieve at least one of a history of natural language queries, a history of query terms, or a history of natural language responses;

identify a set of relevant natural language queries based on the at least one of the history of natural language queries, the history of query terms, or the history of natural language responses; and select a second natural language query from the set of relevant natural language queries, the code to cause the processor to input includes code to cause the processor to input the second natural language query to the machine learning model.

16. The non-transitory processor-readable medium of claim 10, wherein the natural language query is a first natural language query, the code further comprising code to cause the processor to:

retrieve a set of contextual information about a user;

identify a set of contextual natural language queries based on the set of contextual information; and select a second natural language query from the set of contextual natural language queries, the code to cause the processor to input includes code to cause the processor to input the second natural language query to the machine learning model.

17. The non-transitory processor-readable medium of claim 10, wherein the natural language response is accessible by assistive technology.

18. The non-transitory processor-readable medium of claim 10, wherein the predetermined search engine generates the set of search results by interrogating a curated knowledge base.

19. The non-transitory processor-readable medium of claim 10, further comprising code to cause the processor to:

compress the set of plain text to generate a set of compressed plain text; and identify the relevant part from the set of plain text from the set of compressed plain text.

* * * * *

UNITED STATES PATENT AND TRADEMARK OFFICE
CERTIFICATE OF CORRECTION

| | |
|---|---|
| PATENT NO. | : 11,481,388 B2 |
| APPLICATION NO. | : 17/126264 |
| DATED | : October 25, 2022 |
| INVENTOR(S) | : Roy Fugère Sianez |

It is certified that error appears in the above-identified patent and that said Letters Patent is hereby corrected as shown below:

In the Claims

Column 34, Line 59 (Claim 10):
"webpages, HTML, files, rich-text formatted files, por-"

Should read:
-- webpages, HTML files, rich-text formatted files, por- --

Signed and Sealed this
Fourteenth Day of February, 2023

Katherine Kelly Vidal
*Director of the United States Patent and Trademark Office*